United States Patent
Lee et al.

(10) Patent No.: US 10,951,913 B2
(45) Date of Patent: *Mar. 16, 2021

(54) MERGE CANDIDATES FOR MOTION VECTOR PREDICTION FOR VIDEO CODING

(71) Applicant: QUALCOMM Incorporated, San Diego, CA (US)

(72) Inventors: Sungwon Lee, Huntington Beach, CA (US); Wei-Jung Chien, San Diego, CA (US); Li Zhang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,417

(22) Filed: Nov. 7, 2019

(65) Prior Publication Data

US 2020/0077116 A1  Mar. 5, 2020

Related U.S. Application Data

(63) Continuation of application No. 15/591,813, filed on May 10, 2017, now Pat. No. 10,560,718.

(60) Provisional application No. 62/336,449, filed on May 13, 2016.

(51) Int. Cl.
| | |
|---|---|
| *H04N 19/56* | (2014.01) |
| *H04N 19/176* | (2014.01) |
| *H04N 19/52* | (2014.01) |
| *H04N 19/51* | (2014.01) |
| *H04N 19/122* | (2014.01) |

(52) U.S. Cl.
CPC ........... *H04N 19/56* (2014.11); *H04N 19/122* (2014.11); *H04N 19/51* (2014.11); *H04N 19/52* (2014.11); *H04N 19/176* (2014.11)

(58) Field of Classification Search
CPC ..... H04N 19/56; H04N 19/176; H04N 19/122
See application file for complete search history.

(56) References Cited

U.S. PATENT DOCUMENTS

| | | | |
|---|---|---|---|
| 9,066,104 B2 | 6/2015 | Wang et al. | |
| 9,066,110 B2 | 6/2015 | Zhou | |
| 9,204,147 B2 | 12/2015 | Takehara et al. | |
| 9,357,214 B2 | 5/2016 | Zhang et al. | |

(Continued)

OTHER PUBLICATIONS

An J., et al., "Block partitioning structure for next generation video coding", MPEG doc. m37524 and ITU-T SG16 Doc. COM16-C966-E, Oct. 2015, pp. 1-7.

(Continued)

*Primary Examiner* — Tsion B Owens
(74) *Attorney, Agent, or Firm* — Qualcomm Incorporated

(57) ABSTRACT

A method of decoding and encoding video data includes constructing a motion vector candidate list for the current block of video data based on the motion information from the neighboring blocks relative to the current block determined to include motion information, and adaptively ordering the constructed motion vector candidate list for the current block of video data based on at least one weight among a plurality of weights associated with motion information included in each neighboring block determined to include motion information.

22 Claims, 19 Drawing Sheets

(56) References Cited

U.S. PATENT DOCUMENTS

| | | | |
|---|---|---|---|
| 9,516,334 B2 | 12/2016 | Kim et al. | |
| 9,554,150 B2 | 1/2017 | Zhang et al. | |
| 2014/0140408 A1* | 5/2014 | Lee | H04N 19/65 375/240.16 |
| 2014/0168362 A1* | 6/2014 | Hannuksela | H04N 19/597 348/43 |
| 2014/0205014 A1* | 7/2014 | Nakamura | H04N 19/577 375/240.16 |
| 2014/0341306 A1* | 11/2014 | Hendry | H04N 19/70 375/240.26 |
| 2015/0003529 A1* | 1/2015 | Thirumalai | H04N 19/70 375/240.14 |
| 2015/0078450 A1* | 3/2015 | Chen | H04N 19/597 375/240.16 |
| 2015/0181220 A1* | 6/2015 | Sugio | H04N 19/52 375/240.16 |
| 2016/0219278 A1 | 7/2016 | Chen et al. | |
| 2017/0332099 A1 | 11/2017 | Lee et al. | |

OTHER PUBLICATIONS

Bross B., et al., "High Efficiency Video Coding (HEVC) Text Specification Draft 10 (for FDIS & Last Call)," Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, JCTVC-L1003-v34, 263 pp.

Guionnet T., et al., "3D-CE5.h: Reducing the Coding Cost of Merge Index by Dynamic Merge Index re-Allocation," 2, JCT-3V Meeting; 102, MPEG Meeting; Oct. 13, 2012-Oct. 19, 2012; Shanghai; (The Joint Collaborative Team on 3D Video Coding Extension Development of ISO/IEC JTC1/SC29/WG11 and ITU-T SG.16 ); URL: http://phenix.int-evry.fr/JCT2/,, No. JCT3V-B0078, Oct. 8, 2012 (Oct. 8, 2012), XP030130259, 6 pages.

Han W-J., et al., "Improved Video Compression Efficiency Through Flexible Unit Representation and Corresponding Extension of Coding Tools," IEEE Transactions on Circuits and Systems for Video Technology, vol. 20, No. 12, Dec. 2010, pp. 1709-1720.

International Search Report and Written Opinion—PCT/US2017/032177—ISA/EPO—dated Aug. 14, 2017.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

ITU-T H.261, Line Transmission of Non-Telephone Signals, Video Codec for Audiovisual Services At p x 64 kbits, The International Telecommunication Union, Mar. 1993, 29 pp.

ITU-T H.262 (Feb. 2000), "Information Technology—Generic Coding of Moving Pictures and Associated Audio Information: Video", Series H: Audiovisual and Multimedia Systems, Infrastructure of Audiovisual Services—Coding of Moving Video, Feb. 2000, 220 pages.

ITU-T H.263, "Video Coding for Low Bit Rate Communication", Series H: Audiovisual and Multimedia Systems, Infrastructure of audiovisual services—Coding of moving video, Jan. 2005, 226 pages.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.

Karczewicz M., "Algorithm Description of Joint Exploration Test Model 1 (JEM1)", 113. MPEG Meeting, Oct. 19, 2015-Oct. 23, 2015, Geneva, (Motion Picture Expert Group or ISO/IEC JTC1/SC29/WG11), No. N15790, Dec. 11, 2015 (Dec. 11, 2015), 27 Pages, Oct. 30, 2015, XP030022473.

Lee S., et al., "EE2.6: Modification of Merge candidate derivation: ATMVP simplification and Merge pruning," Joint Video Exploration Team (JVET) of ITU-T SG16 WP3 and ISO/IEC JTC1/SC29/WG11 3rd Meeting: Geneva, CH, May 26-Jun. 1, 2016, JVET-00035, 4 pp.

Lin J-L., et al., "CE13: Results of Tests 2d and 2e in section 3.1 on Adaptive MVP List Size," 98, MPEG Meeting; Nov. 28, 2011-Dec. 2, 2011; Geneva; (Motion Picture Expert Group or ISO/IEC JTC1/SC29/WG11),, No. m21791, Nov. 22, 2011 (Nov. 22, 2011), XP030050354, 4 pages.

Lin J-L., et al: "Improved Advanced Motion Vector Prediction", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11 and ITU-T SG.16); URL: http://wftp3.itu.int/av-arch/JCTVC-site/,, No. JCTVC-D125, Jan. 15, 2011, XP030008165, 8 Pages.

Response to Written Opinion dated Aug. 14, 2017, from International Application No. PCT/US2017/032177, filed on Dec. 13, 2017, 18 pp.

Second Written Opinion from International Application No. PCT/US2017/032177, dated Apr. 25, 2018, 9 pp.

U.S. Appl. No. 15/176,790, filed Jun. 8, 2016, by Qualcomm Incorporated.

U.S. Appl. No. 15/431,321, filed Feb. 13, 2017, by Qualcomm Incorporated.

U.S. Appl. No. 14/497,128, filed by Ying Chen, filed Sep. 25, 2014.

Zhang L., et al., "Test Model 6 of 3D-HEVC and MV-HEVC", 6. JCT-3V Meeting; Oct. 25, 2013-Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/JCT2/, No. JCT3V-F1005, Dec. 16, 2013 (Dec. 16, 2013), 52 Pages, XP030131735, the whole document.

* cited by examiner

| a | b | c | d | e |
|---|---|---|---|---|
| f | A | B | C | D |
| g | E | F | G | H |
| h | I | J | K | L |
| i | M | N | O | P |

FIG. 14

HISTOGRAM

MV0 = 3 blocks
MV1 = 4 blocks
MV2 = 1 blocks
MV3 = 2 blocks
MV4 = 1 blocks

MERGE CANDIDATE LIST ORDER

MV1 – candidate a = index 0
MV0 – candidate e = index 1
MV3 – candidate j = index 2
MV2 – candidate f = index 3
MV4 – candidate k = index 4

MERGE CANDIDATES FOR MOTION VECTOR PREDICTION FOR VIDEO CODING

This application claims priority from and is a continuation application of U.S. patent application Ser. No. 15/591,813, filed May 10, 2017 and entitled "MERGE CANDIDATES FOR MOTION VECTOR PREDICTION FOR VIDEO CODING," which claims the benefit of U.S. Provisional Application No. 62/336,449, filed May 13, 2016, the entire content of which is incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, also referred to as High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which for some techniques may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned to produce a one-dimensional vector of transform coefficients, and entropy coding may be applied to achieve even more compression.

SUMMARY

In general, this disclosure describes techniques related to coding (e.g., encoding or decoding) of motion information for a block of video data. In various examples of the disclosure, a motion vector candidate list (also called a merge candidate list or simply a candidate list) may be constructed using motion information from a plurality of neighboring blocks. A histogram of motion information may be derived and then used to determine the order and/or locations of spatial merge candidates for the motion vector candidate list.

In one example, this disclosure describes a method of decoding video data, the method comprising receiving a current block of video data encoded with a merge mode, constructing a motion vector candidate list of merge candidates for the current block of video data based on motion information from a number of neighboring blocks relative to the current block, wherein the number of neighboring blocks considered for the motion vector candidate list is based on the size of the current block, and wherein the number of neighboring blocks is greater than 5, determining a current motion vector from the motion vector candidate list, and decoding the current block of video data using the current motion vector.

In another example, this disclosure describes an apparatus configured to decode video data, the apparatus comprising a memory configured to store a current block of video data and one or more processors configured to receive the current block of video data encoded with a merge mode, construct a motion vector candidate list of merge candidates for the current block of video data based on motion information from a number of neighboring blocks relative to the current block, wherein the number of neighboring blocks considered for the motion vector candidate list is based on the size of the current block, and wherein the number of neighboring blocks is greater than 5, determine a current motion vector from the motion vector candidate list, and decode the current block of video data using the current motion vector.

In another example, this disclosure describes a computer-readable storage medium storing instructions that, when executed, causes one or more processors configured to decode video data to receive the current block of video data encoded with a merge mode, construct a motion vector candidate list of merge candidates for the current block of video data based on motion information from a number of neighboring blocks relative to the current block, wherein the number of neighboring blocks considered for the motion vector candidate list is based on the size of the current block, and wherein the number of neighboring blocks is greater than 5, determine a current motion vector from the motion vector candidate list, and decode the current block of video data using the current motion vector.

In another example, this disclosure describes an apparatus configured to encode video data, the apparatus comprising a memory configured to store a current block of video data and one or more processors configured to receive the current block of video data, construct a motion vector candidate list of merge candidates for the current block of video data based on motion information from a number of neighboring blocks relative to the current block, wherein the number of neighboring blocks considered for the motion vector candidate list is based on the size of the current block, and wherein the number of neighboring blocks is greater than 5, determine a current motion vector from the motion vector candidate list, and encode the current block of video data using the current motion vector.

The details of one or more examples are set forth in the accompanying drawings and the description below. Other features, objects, and advantages will be apparent from the description and drawings, and from the claims.

BRIEF DESCRIPTION OF DRAWINGS

FIG. 14 is a conceptual diagram showing one example of a PU and neighboring blocks.

DETAILED DESCRIPTION

This disclosure describes techniques to improve the efficiency of merge-based motion vector prediction. This disclosure describes techniques for determining merge candidates to use for motion vector prediction. Example techniques of this disclosure may include the adaptive ordering and pruning of merge candidates. Example adaptive ordering techniques of this disclosure may include the adaptive ordering of spatial, sub-prediction unit (PU), and combined motion vector (combi-mv) candidates. In some examples, the proposed adaptive pruning techniques of this disclosure may be applied to all the merge candidates, including temporal motion vector prediction (TMVP) candidates, zero motion vector (zero-mv) candidates, as well as the above-mentioned candidates.

The techniques of this disclosure may provide one or more of the following benefits: (1) higher efficiency (2) simplicity (e.g., lower decoder implementation complexity), and (3) flexibility. The techniques described herein may provide higher bit-savings by assigning higher priority to a merge candidate that is closer in value (or likely to be closer in value) to the actual motion vector. In addition, video encoder and video decoder complexity, as well as memory requirements, is relatively small. Lastly, the proposed techniques can be applied to various codecs, such as H.266 and quad-tree plus binary tree (QTBT) based video codecs. In addition, the proposed techniques provide flexibility, as the techniques may be combined in any manner as the techniques described herein may be used independently or together.

Figure 1:
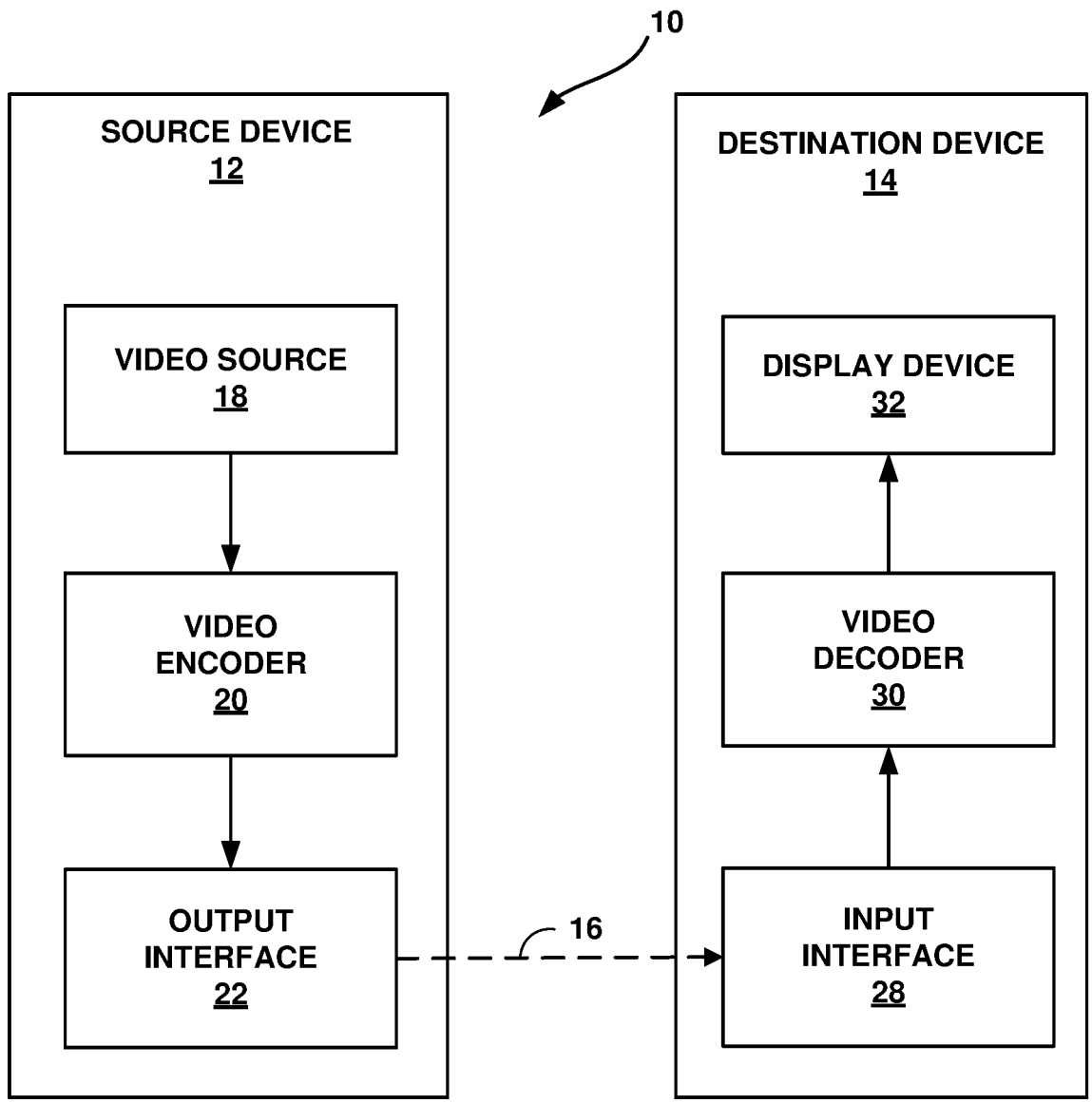
FIG. 1 is a block diagram illustrating an example video encoding and decoding system that may be configured to perform the techniques of this disclosure.

FIG. 1 is a block diagram illustrating an example video encoding and decoding system 10 that may be configured to perform the techniques of this disclosure for motion vector prediction. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques of this disclosure for motion vector prediction. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. The techniques of this disclosure for motion vector prediction may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, extensions to the HEVC standard, or subsequent standards, such as ITU-T H.266. Alternatively or additionally, video encoder 20 and video decoder 30 may also operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As will be explained in more detail below, video encoder 20 and video decoder 30 may be configured to receive a current block of video data, construct a motion vector candidate list of merge candidates for the current block of video data based on motion information from a number of neighboring blocks relative to the current block, wherein the number of neighboring blocks considered for the motion vector candidate list is based on the size of the current block, and wherein the number of neighboring blocks is greater than 5, determine a current motion vector from the motion vector candidate list, and code (e.g., encode or decode) the current block of video data using the current motion vector.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. One joint draft of MVC is described in "Advanced video coding for generic audiovisual services," ITU-T Recommendation H.264, March 2010.

In addition, there is a newly developed video coding standard, namely HEVC, developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://phenix.int-evry.fr/jct/doc_end_user/documents/12_Geneva/wg11/JCTVC-L1003-v34.zip. The HEVC standard is also presented jointly in Recommendation ITU-T H.265 and International Standard ISO/IEC 23008-2, both entitled "High efficiency video coding," and both published October 2014.

The JCT-VC developed the HEVC standard. The HEVC standardization efforts were based on an evolving model of a video coding device referred to as the HEVC Test Model (HM). The HM presumed several additional capabilities of video coding devices relative to existing devices according to, e.g., ITU-T H.264/AVC. For example, whereas H.264 provides nine intra-prediction encoding modes, the HEVC HM may provide as many as thirty-three intra-prediction encoding modes. Although this disclosure may use some HEVC terminology for purposes of explanation, the techniques of this disclosure are not limited to HEVC, and in fact, it is explicitly contemplated that the techniques of this disclosure may be implemented in successor standards to HEVC.

In general, the working model of the HM described that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra-prediction mode. That is, the same intra-prediction mode is generally applied to calculate predicted values for all TUs of a leaf-CU. For intra coding, a video encoder may calculate a residual value for each leaf-TU using the intra-prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Figure 2:
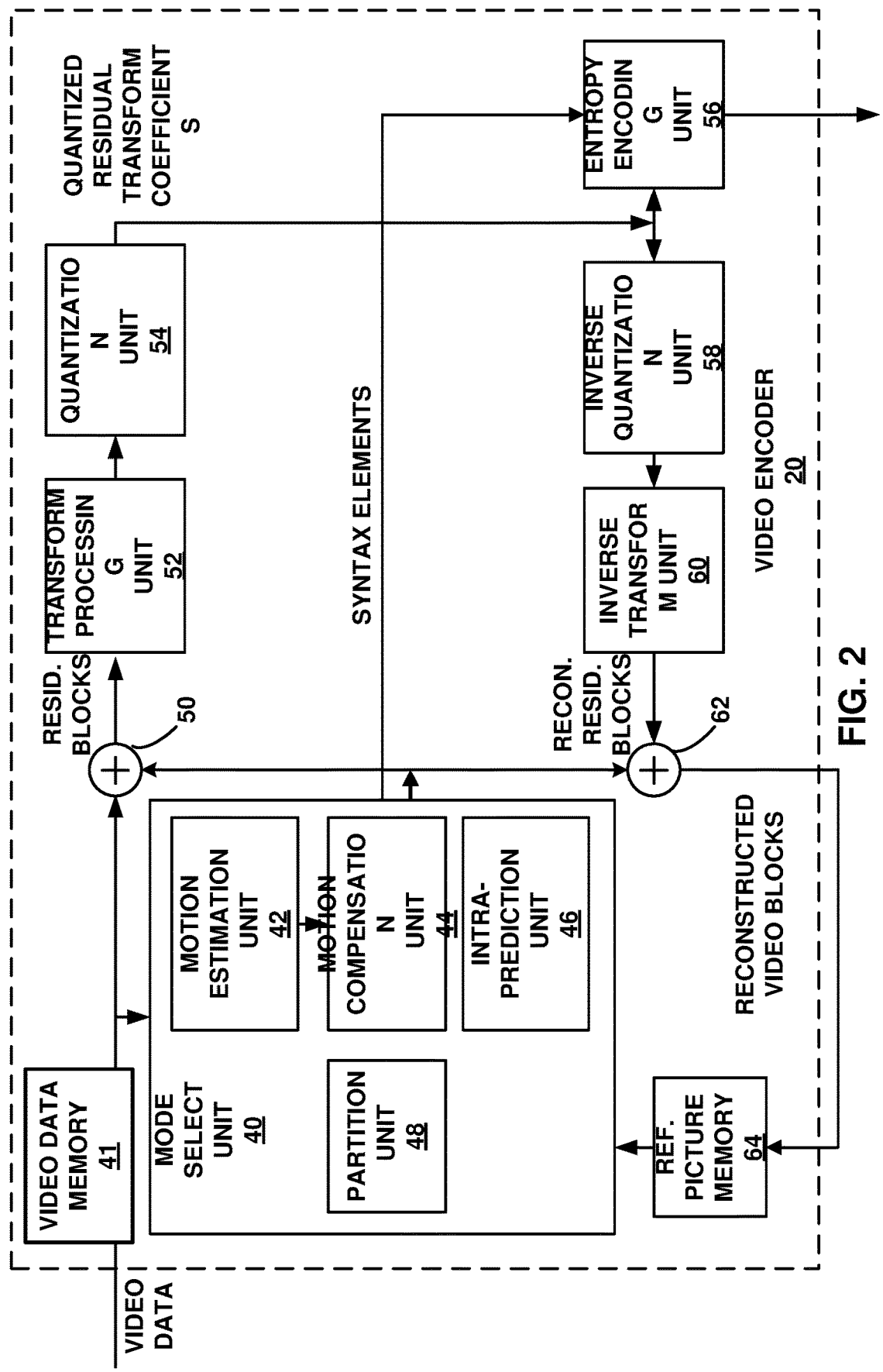
FIG. 2 is a block diagram illustrating an example of video encoder that may be configured to perform the techniques of this disclosure.

FIG. 2 is a block diagram illustrating an example of video encoder 20 that may be configured to perform the techniques of this disclosure for motion vector prediction, as will be explained in more detail below. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes video data memory 41, mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

Video data memory 41 may be configured to store video data to be encoded by the components of video encoder 20. The video data stored in video data memory 41 may be obtained, for example, from video source 18. Reference picture memory 64 (sometimes called a decoded picture buffer) may be a reference picture memory that stores reference video data for use in encoding video data by video encoder 20, e.g., in intra- or inter-coding modes. Video data memory 41 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and reference picture memory 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Video encoder 20, including motion estimation unit 42 and motion compensation unit 44, may be configured to perform any of the various techniques of this disclosure discussed above with respect to FIG. 1, and as will be described in more detail below. For example, motion compensation unit 44 may be configured to code motion information for a block of video data using AMVP or merge mode in accordance with the techniques of this disclosure. In addition, video encoder 20, including motion estimation unit 42 and motion compensation unit 44, may be configured to perform any combination of the motion vector candidate list construction techniques of this disclosure which are described in more detail below. In the context of this disclosure, the terms motion vector candidate list, merge candidate list, and candidate list may be used interchangeably.

Assuming that motion compensation unit 44 elects to perform merge mode, motion compensation unit 44 may form a candidate list including a set of merge candidates. Motion compensation unit 44 may add candidates to the candidate list based on a particular, predetermined order. In other example of the disclosure, motion compensation unit 44 may be configured to add candidates to the candidate list in dynamically different orders, based on histogram information of motion vectors from neighboring blocks. Motion compensation unit 44 may also add additional candidates and perform pruning of the candidate list, as discussed in more detail below. Ultimately, mode select unit 40 may determine which of the candidates is to be used to encode motion information of the current block, and encode a merge index representing the selected candidate.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this manner, video encoder 20 of FIG. 2 represents an example of a video coder configured to derive a histogram of motion vector information from neighboring blocks relative to a current block, determine merge candidates for a motion vector candidate list for motion vector prediction for the current block based on the derived histogram, order the motion vector candidate list based on the derived histogram, and perform merge vector prediction using the motion vector candidate list.

Figure 3:
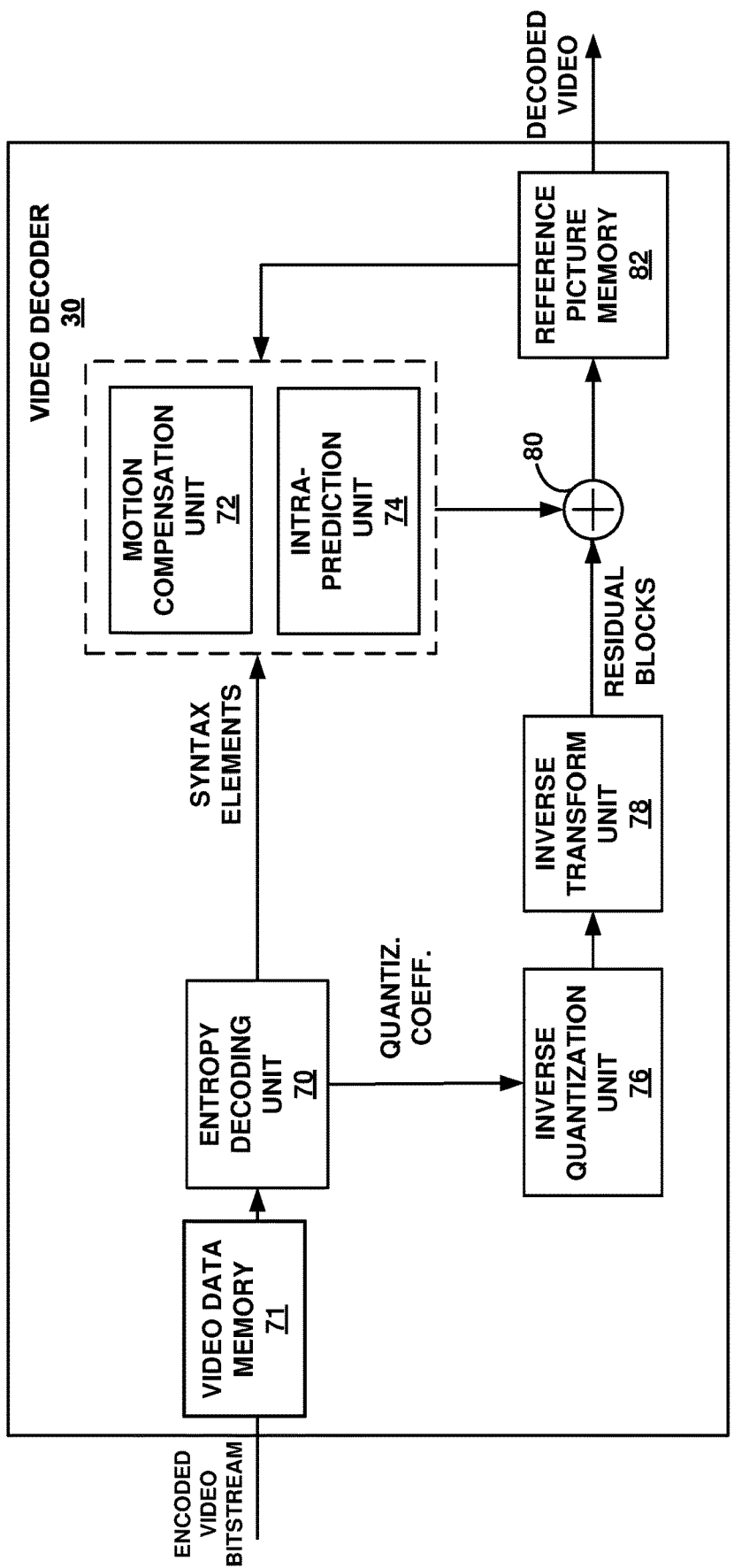
FIG. 3 is a block diagram illustrating an example of video decoder that may be configured to perform the techniques of this disclosure.

FIG. 3 is a block diagram illustrating an example of video decoder 30 that may be configured to perform the motion vector prediction techniques of this disclosure. In the example of FIG. 3, video decoder 30 includes video data memory 71, entropy decoding unit 70, motion compensation unit 72, intra-prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

Video data memory 71 may store encoded video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Reference picture memory 82 (also called a decoded picture buffer (DPB)) may be a reference picture memory that stores reference video data for use in decoding video data by video decoder 30, e.g., in intra- or inter-coding modes, or for output. Video data memory 71 and reference picture memory 82 may be formed by any of a variety of memory devices, such as DRAM, SDRAM, MRAM, RRAM, or other types of memory devices. Video data memory 71 and reference picture memory 82 may be provided by the same memory device or separate memory devices. In various examples, video data memory 71 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., BB or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Video decoder 30, including motion compensation unit 72, may be configured to perform any of the various techniques of this disclosure discussed above with respect to FIG. 1, and as will be discussed in more detail below. For example, motion compensation unit 72 may be configured to perform motion vector prediction using AMVP or merge mode in accordance with the techniques of this disclosure. In addition, video decoder 30, including motion compensation unit 72, may be configured to perform any combination of the motion vector candidate list construction techniques of this disclosure which are described in more detail below. Entropy decoding unit 70 may decode one or more syntax elements representing how motion information is coded for the current block.

Assuming that the syntax elements indicate that merge mode is performed, motion compensation unit 72 may form a candidate list including a set of merge candidates. Motion compensation unit 72 may add candidates to the candidate list based on a particular, predetermined order. In other example of the disclosure, motion compensation unit 72 may be configured to add candidates to the candidate list in dynamically different orders, based on histogram information of motion vectors from neighboring blocks. Motion compensation unit 72 may also add additional candidates and perform pruning of the candidate list, as discussed in more detail below. Ultimately, motion compensation unit 72 may decode a merge index representing which of the candidates is used to code motion information for the current block.

Inverse quantization unit 76 inverse quantizes, i.e., de-quantizes, quantized transform coefficients provided in the bitstream and entropy decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 represents an example of a video coder configured to derive a histogram of motion vector information from neighboring blocks relative to a current block, determine merge candidates for a motion vector candidate list for motion vector prediction for the current block based on the derived histogram, order the motion vector candidate list based on the derived histogram, and perform merge vector prediction using the motion vector candidate list.

The following section describes certain aspects of video coding techniques and standards, especially with regard of motion vector prediction and related techniques. Initially, motion information is discussed. For each block of video data coded using an inter-prediction mode, a set of motion information may be available. The set of motion information contains motion information for forward and backward prediction directions. Here forward and backward prediction directions are two prediction directions corresponding to reference picture list 0 (RefPicList0) and reference picture list 1 (RefPicList1) of a current picture or slice. The terms "forward" and "backward" do not necessarily have a geometric meaning. Instead, they are used to distinguish which reference picture list a motion vector is based on. Forward prediction means the prediction formed based on reference list 0, while backward prediction means the prediction formed based on reference list 1. In case both reference list 0 and reference list 1 are used to form a prediction for a given block, it is called bi-directional prediction.

For a given picture or slice, if only one reference picture list is used, every block inside the picture or slice is forward predicted. If both reference picture lists are used for a given picture or slice, a block inside the picture or slice may be forward predicted, backward predicted, or bi-directionally predicted.

For each prediction direction, the motion information also includes a reference index and a motion vector. A reference index is used to identify a reference picture in a corresponding reference picture list (e.g. RefPicList0 or RefPicList1). A motion vector has both a horizontal and a vertical component, with each component indicating an offset value along horizontal and vertical direction, respectively. The motion vector indicates the position of the predictor block relative to the position of the current block being coded. The reference index indicates the picture that contains the predictor block. In some descriptions, for simplicity, the term "motion vector" may be used interchangeably with motion information, to indicate both the motion vector and its associated reference index.

Picture order count (POC) is widely used in video coding standards to identify a display order of a picture. Although there are cases in which two pictures within one coded video sequence may have the same POC value, it typically does not happen within a coded video sequence. When multiple coded video sequences are present in a bitstream, pictures with a same value of POC may be closer to each other in terms of decoding order. POC values of pictures are typically used for reference picture list construction, derivation of reference picture sets as in HEVC and motion vector scaling.

The next section describes the macroblock (MB) structure in Advanced Video Coding (AVC) (H.264). In H.264/AVC, each inter macroblock (MB) (e.g., a MB coded using inter-prediction) may be partitioned in four different ways:

One 16×16 MB partition
Two 16×8 MB partitions
Two 8×16 MB partitions
Four 8×8 MB partitions Different MB partitions in one MB may have different reference index values for each prediction direction (RefPicList0 or RefPicList1). When an MB is not partitioned into four 8×8 MB partitions, the MB has only one motion vector for each MB partition in each prediction direction.

When an MB is partitioned into four 8×8 MB partitions, each 8×8 MB partition can be further partitioned into sub-blocks, each of which can have a different motion vector in each prediction direction. There are four different ways to divide an 8×8 MB partitions into sub-blocks:

One 8×8 sub-block
Two 8×4 sub-blocks
Two 4×8 sub-blocks
Four 4×4 sub-blocks

Each sub-block may have a different motion vector in each prediction direction. Therefore, a motion vector is present in a level equal to or higher than the sub-block.

Temporal direct mode in AVC will no be described. In AVC, temporal direct mode may be enabled at either the MB level or the MB partition level for skip or direct mode in B slices. For each MB partition, the motion vectors of the block co-located with the current MB partition in the RefPicList1 [0] of the current block are used to derive the motion vectors. Each motion vector in the co-located block is scaled based on POC distances. In AVC, a direct mode can also predict motion information from the spatial neighbors.

Figure 4:
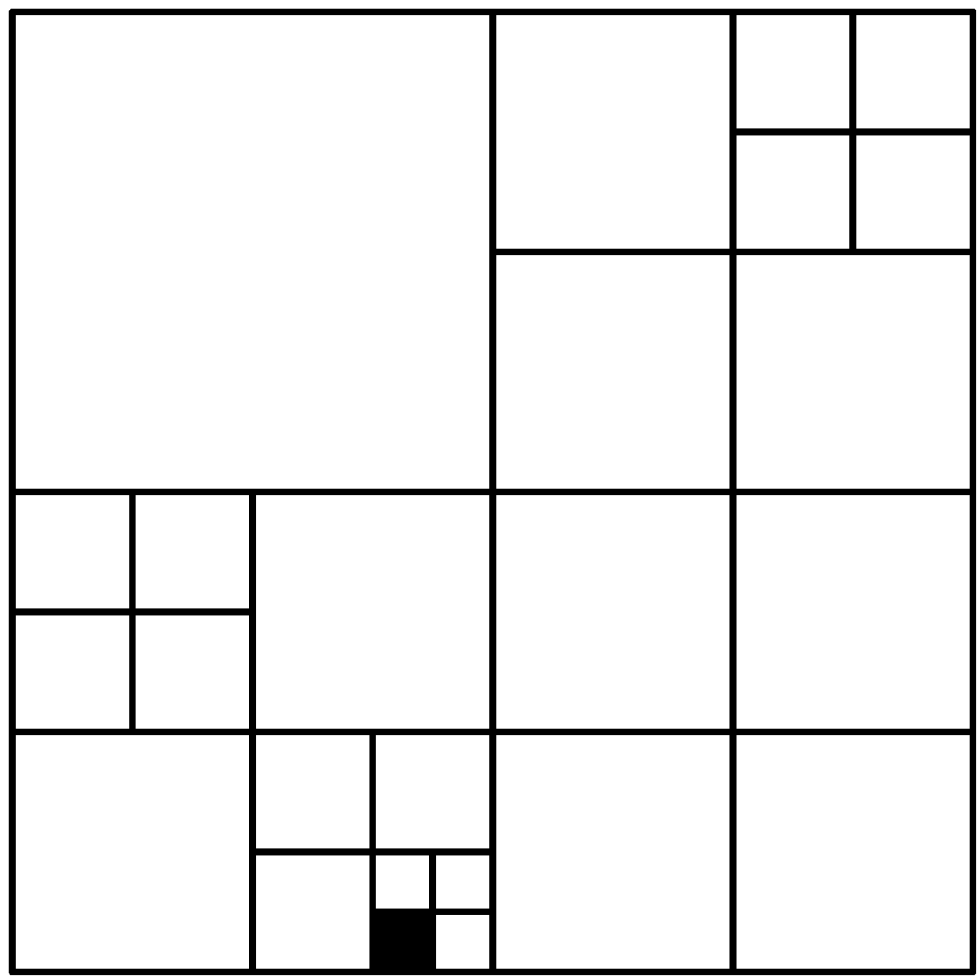
FIG. 4 is a conceptual diagram illustrating coding unit (CU) structure in High Efficiency Video Coding (HEVC).

Coding Unit (CU) structure in HEVC will now be described. In HEVC, the largest coding unit in a slice is called a coding tree block (CTB) or coding tree unit (CTU). A CTB contains a quad-tree the nodes of which are coding units. A CTB may be recursively split into CUs in a quad-tree manner, as described in W. J. Han et al, "Improved Video Compression Efficiency Through Flexible Unit Representation and Corresponding Extension of Coding Tools," IEEE Transaction on Circuits and Systems for Video Technology, vol. 20, no. 12, pp. 1709-1720, December 2010, and shown in FIG. 4. As shown in FIG. 4, each level of partitioning is a quad-tree split into four sub-blocks. The black block is an example of a leaf-node (i.e., a block that is not further split).

The size of a CTB can range from 16×16 to 64×64 in the HEVC main profile (although technically 8×8 CTB sizes can be supported). A CU could be the same size of a CTB although and as small as 8×8. Each CU is coded with one mode (e.g., an intra-prediction mode or an inter prediction mode). When a CU is inter coded, the CU may be further partitioned into 2 or 4 prediction units (PUs) or become just one PU when further partition isn't applied. When two PUs are present in one CU, the PUs can be half size rectangles or two rectangles that are ¼ or ¾ the size of the CU.

When the CU is inter coded, one set of motion information (e.g., motion vector, prediction direction, and reference picture) is present for each PU. In addition, each PU is coded with a unique inter-prediction mode to derive the set of motion information. However, it should be understood that even two PUs are coded uniquely, they may still have the same motion information in some circumstances.

Figure 5:
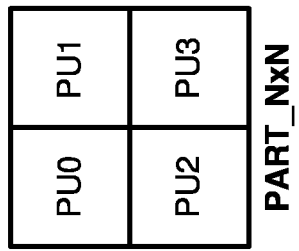
FIG. 5 is a conceptual diagram illustrating example partition types for an inter prediction mode.
Figure 5:
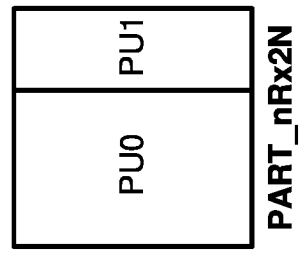
Figure 5:
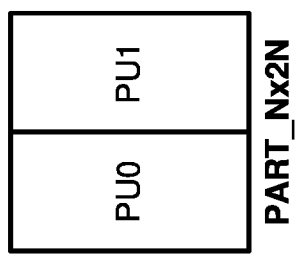
Figure 5:
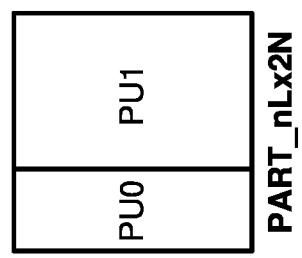
Figure 5:
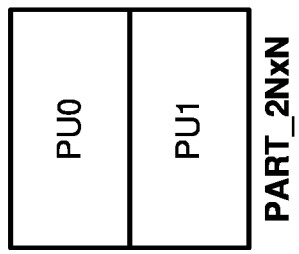
Figure 5:
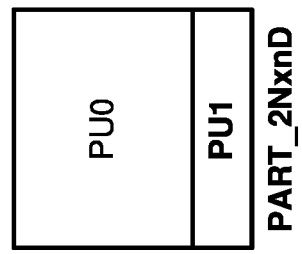
Figure 5:
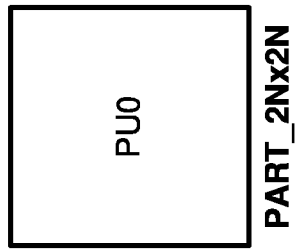
Figure 5:
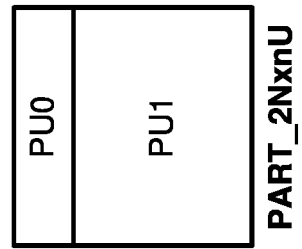

In HEVC, there are eight partition modes for a CU coded with inter prediction mode, i.e., PART_2N×2N, PART_2N×N, PART_N×2N, PART_N×N, PART_2N×nU, PART_2N×nD, PART_nL×2N and PART_nR×2N, as shown in FIG. 5. A CU coded with partition mode PART_2N×2N is not further split. That is, the entire CU is treated as a single PU (PU0). A CU coded with partition mode PART_2N×N is symmetrically horizontally split into two PUs (PU0 and PU1). A CU coded with partition mode PART_N×2N is symmetrically vertically split into two PUs. A CU coded with partition mode PART_N×N is symmetrically split into four equal-sized PUs (PU0, PU1, PU2, PU3).

A CU coded with partition mode PART_2N×nU is asymmetrically horizontally split into one PU0 (the upper PU) having ¼ the size of the CU and one PU1 (the lower PU) having ¾ the size of the CU. A CU coded with partition mode PART_2N×nD is asymmetrically horizontally split into one PU0 (the upper PU) having ¾ the size of the CU and one PU1 (the lower PU) having ¼ the size of the CU. A CU coded with partition mode PART_nL×2N is asymmetrically vertically split into one PU0 (the left PU) having ¼ the size of the CU and one PU1 (the right PU) having ¾ the size of the CU. A CU coded with partition mode PART_nR×2N is asymmetrically vertically split into one PU0 (the left PU) having ¾ the size of the CU and one PU1 (the right PU) having ¼ the size of the CU.

While HEVC uses a quadtree partitioning structure, other partitioning structure are being studied for future video coding standards. For example, in J. An et al., "Block partitioning structure for next generation video coding", International Telecommunication Union, COM16-C966, September 2015 (hereinafter, "VCEG proposal COM16-C966"), quad-tree-binary-tree (QTBT) partitioning techniques were proposed for future video coding standard beyond HEVC (e.g., H.266). Simulations have shown that the proposed QTBT structure is more efficient than the quad-tree structure in used HEVC for some video sequences.

In the proposed QTBT structure of VCEG proposal COM16-C966, a CTB is first partitioned using quad-tree portioning techniques, where the quad-tree splitting of one node can be iterated until the node reaches the minimum allowed quad-tree leaf node size. The minimum allowed quad-tree leaf node size may be indicated to video decoder by the value of the syntax element MinQTSize. If the quad-tree leaf node size is not larger than the maximum allowed binary-tree root node size (e.g., as denoted by a syntax element MaxBTSize), the quad-tree leaf node can be further partitioned using binary-tree partitioning. The binary-tree partitioning of one node can be iterated until the node reaches the minimum allowed binary-tree leaf node size (e.g., as denoted by a syntax element MinBTSize) or the maximum allowed binary-tree depth (e.g., as denoted by a syntax element MaxBTDepth). VCEG proposal COM16-C966 uses the term "CU" to refer to binary-tree leaf nodes. In VCEG proposal COM16-C966, CUs are used for prediction (e.g., intra-prediction, inter prediction, etc.) and transform without any further partitioning. In general, according to QTBT techniques, there are two splitting types for binary-tree splitting: symmetric horizontal splitting and symmetric vertical splitting. In each case, a block is split by dividing the block down the middle, either horizontally or vertically.

In one example of the QTBT partitioning structure, the CTU size is set as 128×128 (e.g., a 128×128 luma block and two corresponding 64×64 chroma blocks), the MinQTSize is set as 16×16, the MaxBTSize is set as 64×64, the MinBTSize (for both width and height) is set as 4, and the MaxBTDepth is set as 4. The quad-tree partitioning is applied to the CTU first to generate quad-tree leaf nodes. The quad-tree leaf nodes may have a size from 16×16 (i.e., the MinQTSize is 16×16) to 128×128 (i.e., the CTU size). According to one example of QTBT partitioning, if the leaf quad-tree node is 128×128, the leaf quad-tree node cannot be further split by the binary-tree since the size of the leaf quad-tree node exceeds the MaxBTSize (i.e., 64×64). Otherwise, the leaf quad-tree node is further partitioned by the binary-tree. Therefore, the quad-tree leaf node is also the root node for the binary-tree and has the binary-tree depth as 0. The binary-tree depth reaching MaxBTDepth (e.g., 4) implies that there is no further splitting. The binary-tree node having a width equal to the MinBTSize (e.g., 4) implies that there is no further horizontal splitting. Similarly, the binary-tree node having a height equal to MinBTSize implies no further vertical splitting. The leaf nodes of the binary-tree (CUs) are further processed (e.g., by performing a prediction process and a transform process) without any further partitioning.

Figures 6A, 6B:
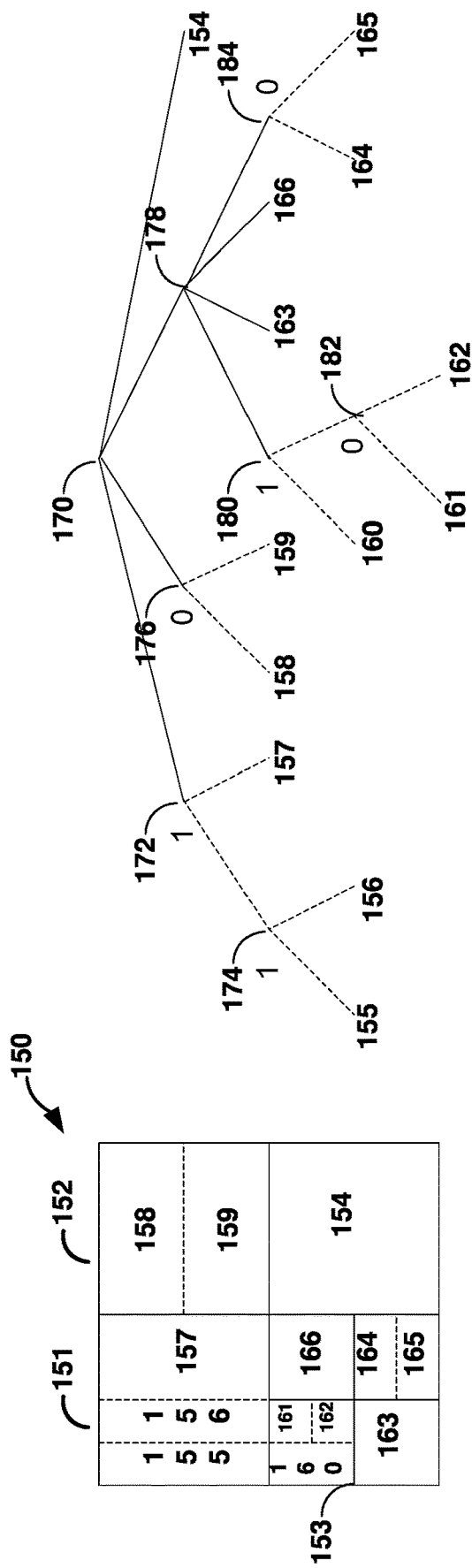
FIG. 6A is a conceptual diagram illustrating an example of block partitioning using a quad-tree-binary-tree (QTBT) structure.
FIG. 6B is a conceptual diagram illustrating an example tree structure corresponding to the block partitioning using the QTBT structure of FIG. 6A.

FIG. 6A illustrates an example of a block 150 (e.g., a CTB) partitioned using QTBT partitioning techniques. As shown in FIG. 6A, using QTBT partition techniques, each of the resultant blocks is split symmetrically through the center of each block. FIG. 6B illustrates the tree structure corresponding to the block partitioning of FIG. 6A. The solid lines in FIG. 6B indicate quad-tree splitting and dotted lines indicate binary-tree splitting. In one example, in each splitting (i.e., non-leaf) node of the binary-tree, a syntax element (e.g., a flag) is signaled to indicate the type of splitting performed (e.g., horizontal or vertical), where 0 indicates horizontal splitting and 1 indicates vertical splitting. For the quad-tree splitting, there is no need to indicate the splitting type, as quad-tree splitting always splits a block horizontally and vertically into 4 sub-blocks with an equal size.

As shown in FIG. 6B, at node 170, block 150 is split into the four blocks 151, 152, 153, and 154, shown in FIG. 6A, using QT partitioning. Block 154 is not further split, and is therefore a leaf node. At node 172, block 151 is further split into two blocks using BT partitioning. As shown in FIG. 6B, node 172 is marked with a 1, indicating vertical splitting. As such, the splitting at node 172 results in block 157 and the block including both blocks 155 and 156. Blocks 155 and 156 are created by a further vertical splitting at node 174. At node 176, block 152 is further split into two blocks 158 and 159 using BT partitioning. As shown in FIG. 6B, node 176 is marked with a 1, indicating horizontal splitting.

At node 178, block 153 is split into 4 equal size blocks using QT partitioning. Blocks 163 and 166 are created from this QT partitioning and are not further split. At node 180, the upper left block is first split using vertical binary-tree splitting resulting in block 160 and a right vertical block. The right vertical block is then split using horizontal binary-tree splitting into blocks 161 and 162. The lower right block created from the quad-tree splitting at node 178, is split at node 184 using horizontal binary-tree splitting into blocks 164 and 165.

The motion vector candidate list construction techniques that are described in more detail below may be used in conjunction with any video block partitioning techniques, including the MB partitioning structure of H.264/AVC, the quadtree partitioning structure of HEVC, or a QTBT partitioning structure, such as the QTBT structure proposed for H.266.

Motion prediction in HEVC will now be described. In the HEVC standard, there are two inter prediction modes for a PU, named merge mode (skip is considered as a special case of merge) and advanced motion vector prediction (AMVP) mode, respectively. In either AMVP or merge mode, video encoder 20 and video decoder 30 are configured to construct a motion vector (MV) candidate list for multiple motion vector predictors. A motion vector predictor may be a motion vector from a neighboring block, or an artificially generated motion vector, that may be used to predict the motion vector for a currently coded block of the video data. For merge mode, rather than encoding the motion vector of the current block itself, video encoder 20 selects one motion vector from the motion vector candidate list, as well as the reference index associated with that candidate, and uses that candidate motion vector for inter prediction. Video encoder 20 may signal an index (e.g., merge index) of the selected motion vector candidate to video decoder 30. Video decoder 30 may construct the motion vector candidate list for merge mode in the same manner as video encoder 20. Video decoder 30 may use the signaled index into the motion vector candidate list to identify the selected candidate, and then retrieve the motion vector and reference index associated with that candidate to use as the motion vector for the current block.

The MV candidate list contains up to 5 candidates for the merge mode and two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index is explicitly signaled, together with a motion vector predictor (MVP) index to the MV candidate list since the AMVP candidate contains only a motion vector. In AMVP mode, the predicted motion vectors can be further refined. In some examples of AMVP, video encoder 20 may also signal a motion vector difference (MVD). An MVD is the difference between the selected MVP and the actual determined motion vector for the current block. As can be seen above, a merge candidate corresponds to a full set of motion information while an AMVP candidate contains just one motion vector for a specific prediction direction and reference index.

Figure 7:
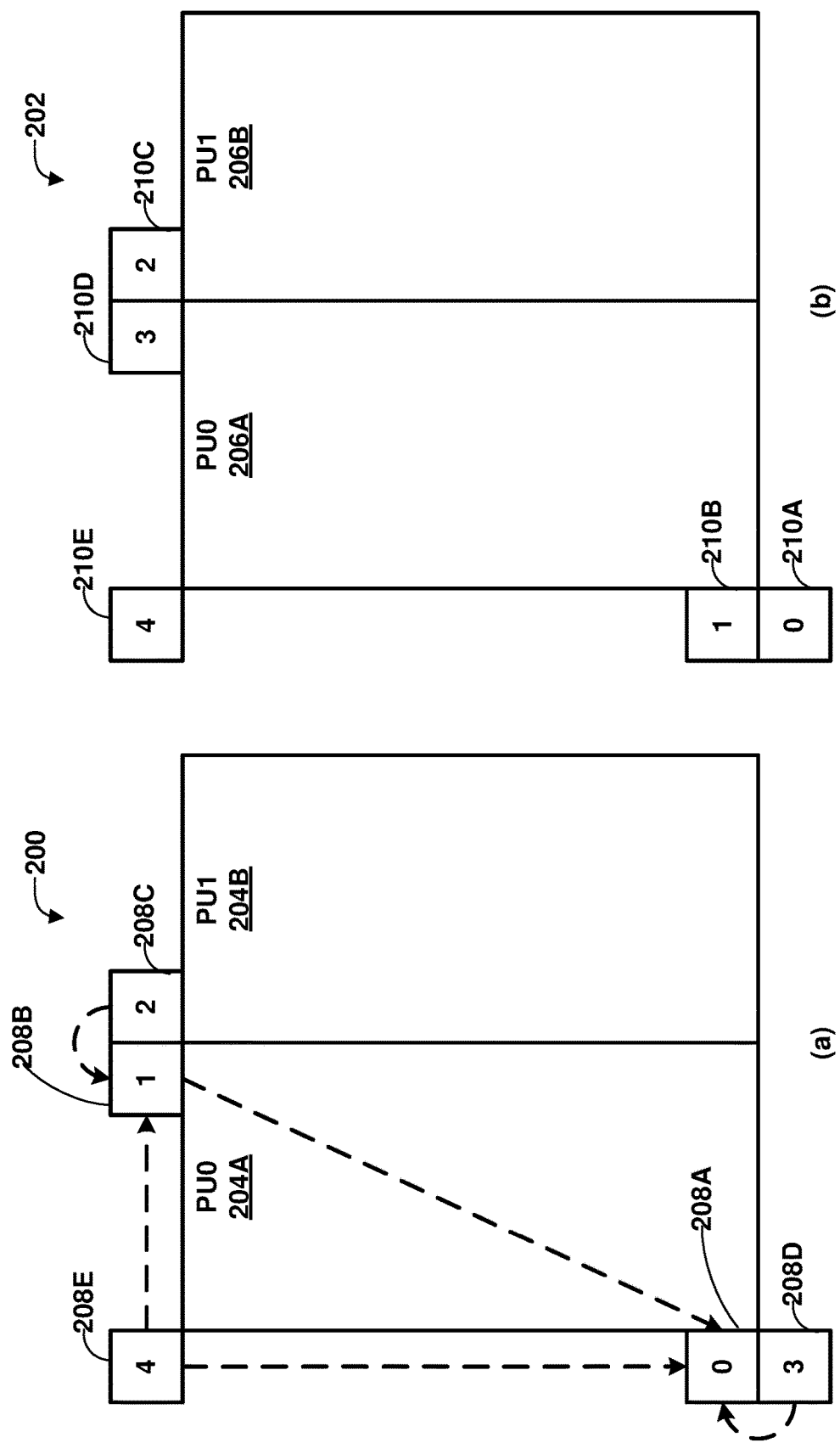
FIG. 7 is a conceptual diagram illustrating spatial neighboring candidates in HEVC.

FIG. 7 is a conceptual diagram illustrating spatial neighboring candidates in HEVC. Spatial MV candidates are derived from the neighboring blocks shown on FIG. 7, for a specific PU (PU0), although the methods of generating the candidates from the blocks differ for merge and AMVP modes.

In merge mode, up to four spatial MV candidates can be derived in the order shown in FIG. 7(a). The order is the following: left (0, A1), above (1, B1), above-right (2, B0), below-left (3, A0), and above left (4, B2), as shown in FIG. 7(a). That is, in FIG. 7(a), block 200 includes PU0 204A and PU1 204B. When a video coder (e.g., video encoder 20 and/or video decoder 30) is to code motion information for PU0 204A using merge mode, the video coder adds motion information from spatial neighboring blocks 208A, 208B, 208C, 208D, and 208E to a candidate list, in that order. Blocks 208A, 208B, 208C, 208D, and 208E may also be referred to as, respectively, blocks A1, B1, B0, A0, and B2, in HEVC.

In AVMP mode, the neighboring blocks are divided into two groups: a left group including blocks 0 and 1, and an above group including blocks 2, 3, and 4 as shown on FIG. 7(b). These blocks are labeled, respectively, as blocks 210A, 210B, 210C, 210D, and 210E in FIG. 7(b). Block 202 includes PU0 206A and PU1 206B, and blocks 210A, 210B, 210C, 210D, and 210E represent spatial neighbors to PU0 206A. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate; thus, the temporal distance differences can be compensated.

Figure 8:
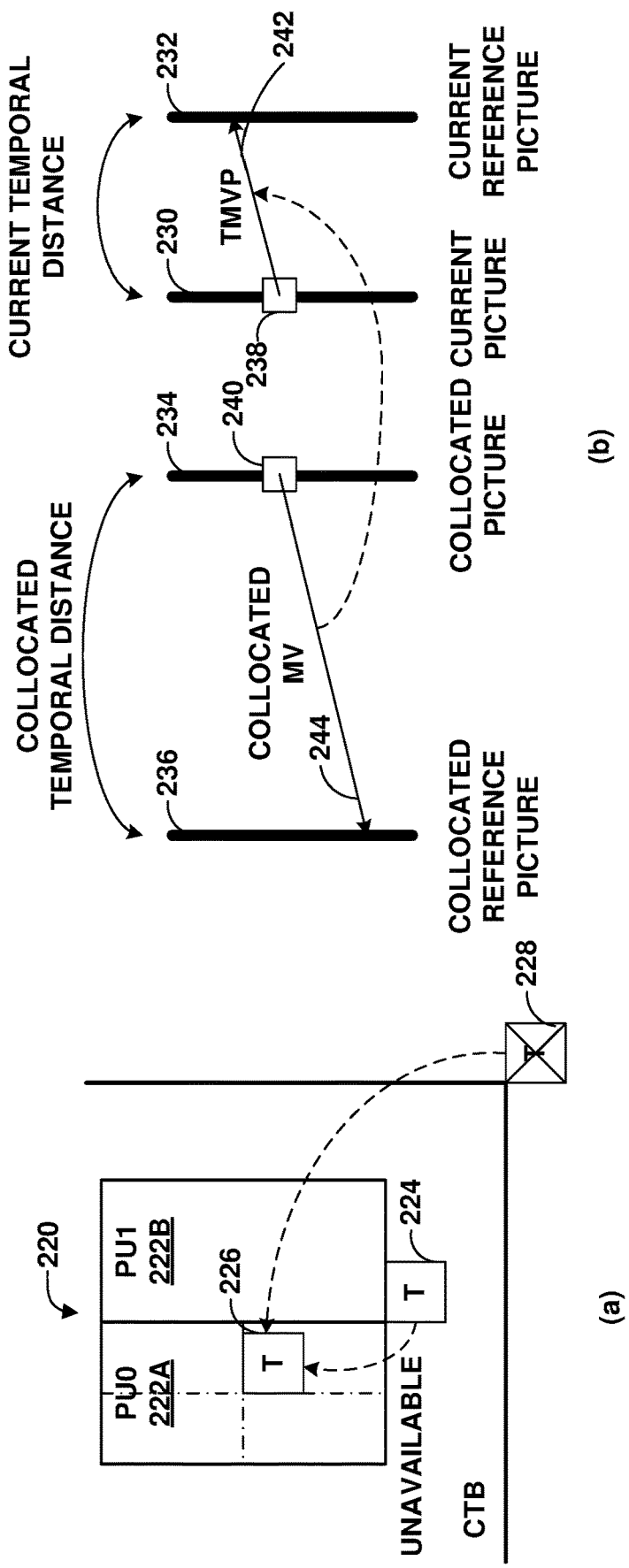
FIG. 8 is a conceptual diagram illustrating temporal motion vector prediction (TMVP) in HEVC.

FIG. 8 is a conceptual diagram illustrating temporal motion vector prediction (TMVP) in HEVC. In particular, FIG. 8(a) illustrates an example CU 220 including PU0 222A and PU1 222B. PU0 222A includes a center block 226 for PU 222A and a bottom-right block 224 to PU0 122A. FIG. 8(a) also shows an external block 228 for which motion information may be predicted from motion information of PU0 222A, as discussed below. FIG. 8(b) illustrates a current picture 230 including a current block 238 for which motion information is to be predicted. In particular, FIG. 8(b) illustrates a collocated picture 234 to current picture 230 (including collocated block 240 relative to current block 238), a current reference picture 232, and a collocated reference picture 236. Collocated block 240 is predicted using motion vector 244, which is used as a temporal motion vector predictor (TMVP) 242 for motion information of block 238.

A video coder (e.g., video encoder 20 and/or video decoder 30) may add a TMVP candidate (e.g., TMVP candidate 242) into the MV candidate list after any spatial motion vector candidates if TMVP is enabled and the TMVP candidate is available. The process of motion vector derivation for the TMVP candidate is the same for both merge and AMVP modes. However, the target reference index for the TMVP candidate in the merge mode is set to 0, according to HEVC.

The primary block location for the TMVP candidate derivation is the bottom right block outside of the collocated PU, as shown in FIG. 8(a) as block 224 to PU0 222A, to compensate the bias to the above and left blocks used to generate spatial neighboring candidates. However, if block 224 is located outside of the current CTB row or motion information is not available for block 224, the block is substituted with center block 226 of the PU as shown in FIG. 8(a). The motion vector for TMVP candidate 242 is derived from co-located block 240 of co-located picture 234, as indicated in slice level information.

Similar to temporal direct mode in AVC, a motion vector of the TMVP candidate may be subject to motion vector scaling, which is performed to compensate POC distance differences between current picture 230 and current reference picture 232, and collocated picture 234 and collocated reference picture 236. That is, motion vector 244 may be scaled to produce TMVP candidate 242, based on these POC differences. Other aspects of motion prediction in HEVC are described below.

Motion vector scaling may be performed in HEVC. It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation may also be performed in HEVC. If a motion vector candidate list is not complete (e.g., includes less than the prescribed number of candidates), video encoder 20 and/or video decoder 30 may generate artificial motion vector candidates. Video encoder 20 and/or video decoder 30 generates and inserts artificial motion vector candidates at the end of the motion vector candidate list until the motion vector candidate list has the prescribed number of candidates.

In merge mode, there may be two types of artificial MV candidates: a bi-directional combined artificial motion vector candidate derived for B-slices and zero motion vector candidates used only AMVP if the first type (i.e., the combined artificial motion vector candidate) does not provide enough artificial candidates to fill the candidate list.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1. A zero motion vector candidate simply points to a co-located block in another picture (e.g., the zero motion vector candidate is (0,0)).

Video coders configured in accordance with HEVC may also perform a pruning process for candidate insertion. Motion vector candidates from different blocks may happen to be the same, which decreases the efficiency of a merge/ AMVP candidate list. That is having multiple motion vector candidates with the same value decreases the actual number of motion vector to test and select. A pruning process may be applied to solve this problem. A pruning process compares one motion vector candidate against the others in the current candidate list to avoid inserting identical candidate in certain circumstances. To reduce the complexity, only a limited numbers of pruning processes is applied instead of comparing each potential one with all the other existing ones.

Figure 9:
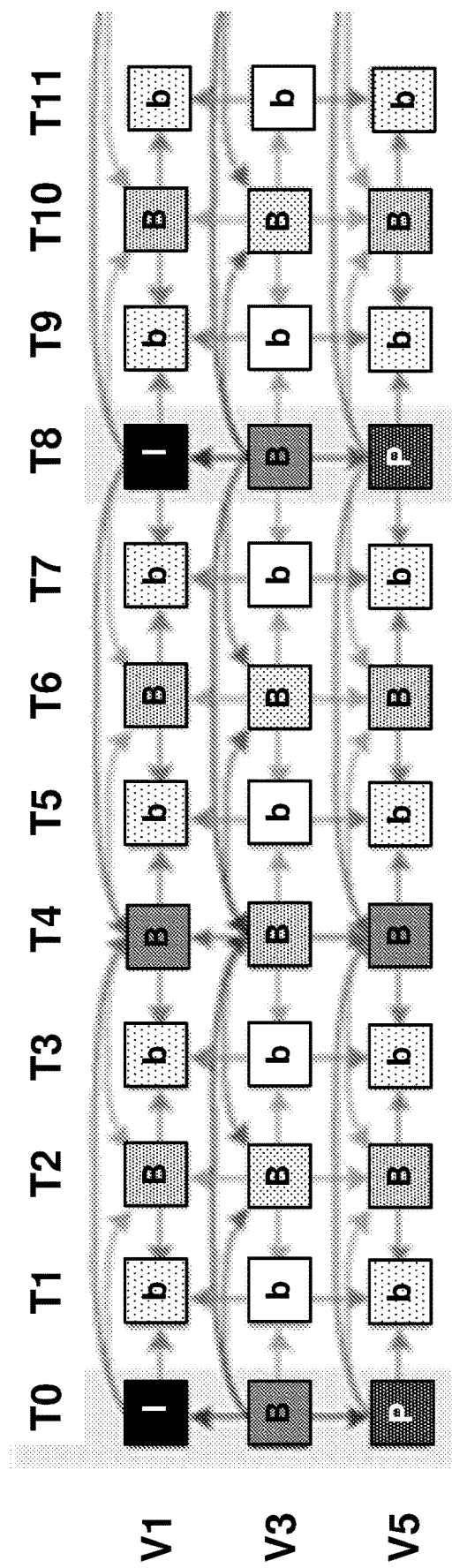
FIG. 9 is a conceptual diagram illustrating an example prediction structure for 3D-HEVC.
Figure 10:
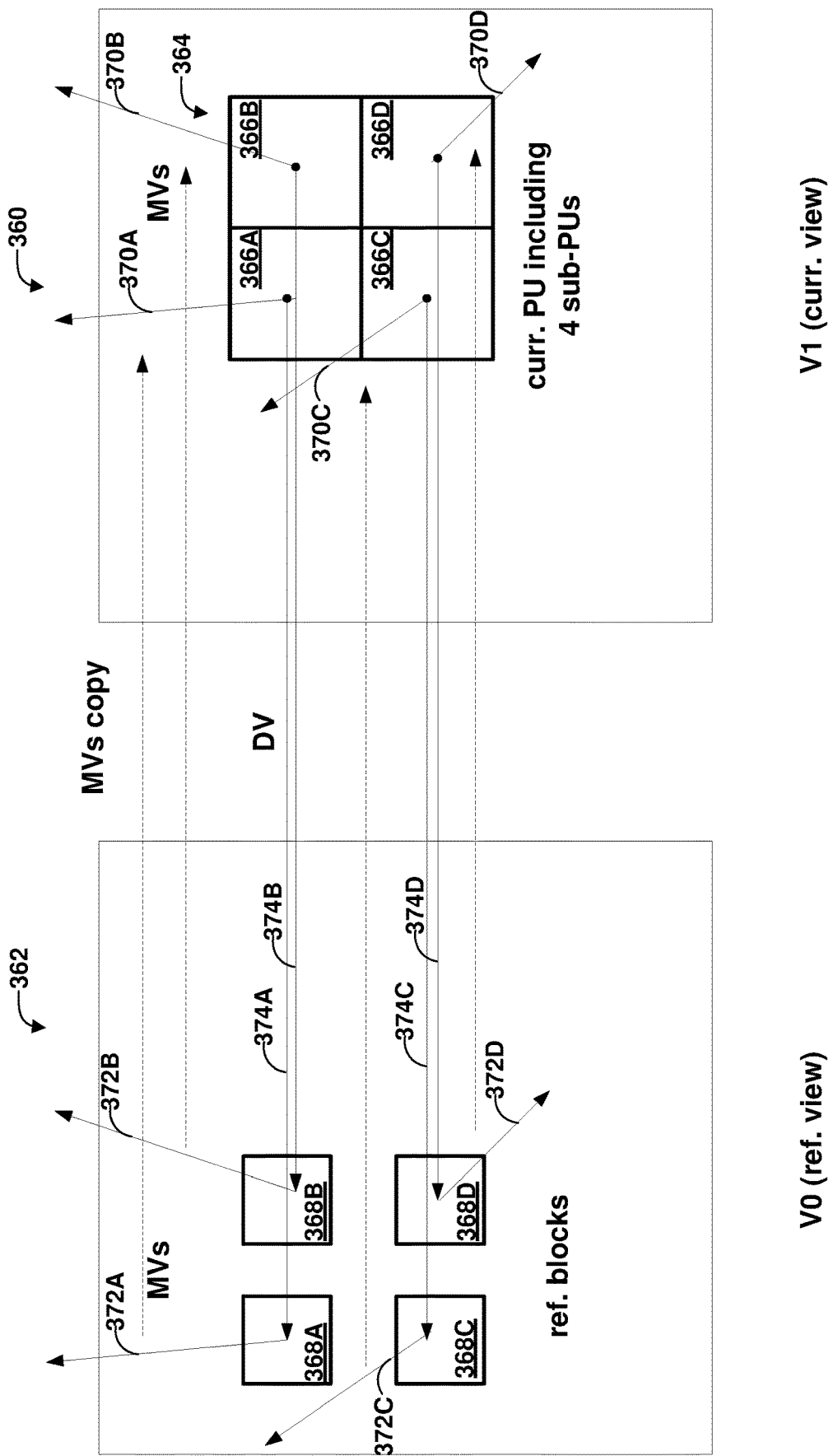
FIG. 10 is a conceptual diagram illustrating sub-PU based inter-view motion prediction in 3D-HEVC.

FIG. 9 illustrates an example prediction structure for 3D-HEVC. 3D-HEVC is a 3D video extension of HEVC under development by JCT-3V. Certain techniques related to the techniques of this disclosure are described with respect to FIGS. 9 and 10 below. FIG. 9 shows a multiview prediction structure for a three-view case. V3 denotes the base view and a picture in a non-base view (V1 or V5) can be predicted from pictures in a dependent (base) view of the same time instance. Inter-view sample prediction (from reconstructed samples) is supported in multi-view HEVC (MV-HEVC), a typical prediction structure of which is shown in FIG. 10.

Both MV-HEVC and 3D-HEVC are compatible with HEVC in a way that the base (texture) view is decodable by HEVC (version 1) decoder. A test model for MV-HEVC and 3D-HEVC is described in Zhang et al., "Test Model 6 of 3D-HEVC and MV-HEVC," JCT-3V document ISO/IEC JTC1/SC29/WG11 N13940, available at the website mpeg-.chiariglione.org/standards/mpeg-h/high-efficiency-video-coding/test-model-6-3d-hevc-and-mv-hevc as of Jan. 26, 2015.

In MV-HEVC, a current picture in a non-base view may be predicted by both pictures in the same view and pictures in a reference view of the same time instance, by putting all of these pictures in reference picture lists of the picture. Therefore, a reference picture list of the current picture contains both temporal reference pictures and inter-view reference pictures. A motion vector associated with a reference index corresponding to a temporal reference picture is denoted a temporal motion vector. A motion vector associated with a reference index corresponding to an inter-view reference picture is denoted a disparity motion vector. 3D-HEVC supports all features in MV-HEVC. Therefore, inter-view sample prediction as mentioned above is enabled.

In addition, more advanced texture only coding tools and depth related/dependent coding tools are supported in 3D-HEVC. The texture-only coding tools often use the identification of the corresponding blocks (between views) that may belong to the same object. Therefore, disparity vector derivation is a one technique used in 3D-HEVC.

FIG. 10 is a conceptual diagram illustrating sub-PU based inter-view motion prediction in 3D-HEVC. FIG. 10 shows current picture 360 of a current view (V1) and a collocated picture 362 in a reference view (V0). Current picture 360 includes a current PU 364 including four sub-Pus 366A-366D (sub-PUs 366). Respective disparity vectors 374A-374D (disparity vectors 374) identify corresponding sub-PUs 368A-368D to sub-PUs 366 in collocated picture 362. In 3D-HEVC, a sub-PU level inter-view motion prediction method is used for the inter-view merge candidate, i.e., the candidate derived from a reference block in the reference view.

When such a mode is enabled, current PU 364 may correspond to a reference area (with the same size as current PU identified by the disparity vector) in the reference view and the reference area may have richer motion information (e.g., many different associated motion vector) than needed for generation one set of motion information for a PU. Therefore, a sub-PU level inter-view motion prediction (SPIVMP) method may be used, as shown in FIG. 10. This mode may also be signaled as a special merge candidate. Each of the sub-PUs contains a full set of motion information. Therefore, a PU may contain multiple sets of motion information.

Sub-PU based Motion Parameter Inheritance (MPI) may also be used in 3D-HEVC. In depth coding of 3D-HEVC, the MPI candidate derived from texture view can also be extended in a way similar to sub-PU level inter-view motion prediction. For example, if the current depth PU has a co-located region which contains multiple PUs, the current depth PU may be separated into sub-PUs, each sub-PU may have a different set of motion information. This method is called sub-PU MPI.

Example sub-PU related techniques for 2D video coding are described in U.S. application Ser. No. 14/497,128, filed Sep. 25, 2014, the entirety of which is incorporated by reference herein. In U.S. application Ser. No. 14/497,128, a sub-PU based advanced TMVP (ATMVP) design has been proposed.

In single-layer coding, a two-stage advanced temporal motion vector prediction design may be used. The first stage is utilized to derive a vector identifying the corresponding block of the current prediction unit (PU) in a reference picture and a second stage is to extract multiple sets motion information from the corresponding block and assign them to sub-PUs of the PU. Each sub-PU of the PU is, therefore, motion compensated separately. The concept of ATMVP is summarized as follows: (1) The vector in the first stage can be derived from spatial and temporal neighboring blocks of the current PU. (2) This process may be achieved as activating a merge candidate among all the other merge candidates. Applicable to single-layer coding and sub-PU temporal motion vector prediction, a PU or CU may have motion refinement data to be conveyed on top of the predictors.

Several aspects of U.S. application Ser. No. 14/497,128 are highlighted as follows:
1. The first stage of vector derivation can also be simplified by just a zero vector.
2. The first stage of vector derivation may include jointly identifying the motion vector and its associated picture. Various ways of selecting the associated picture and further deciding the motion vector to be the first stage vector have been proposed.
3. If the motion information during the above process is unavailable, the "first stage vector" is used for substitution.
4. A motion vector identified from a temporal neighbor may be scaled to be used for the current sub-PU, in a way similar to motion vector scaling in TMVP. However, which reference picture such a motion vector may be scaled to can be designed with one of the following ways:
    a. The picture is identified by a fixed reference index of the current picture.
    b. The picture is identified to be the reference picture of the corresponding temporal neighbor, if also available in a reference picture list of the current picture.
    c. The picture is set to be the co-located picture identified in the first stage and from where the motion vectors are grabbed from.

To address some design issues in U.S. application Ser. No. 14/497,128, the following techniques were proposed in U.S. application Ser. No. 15/005,564, filed Jan. 25, 2016 the entire content of which is incorporated by reference herein.
1. Position of the ATMVP candidate, if inserted, e.g., as a merge candidate list
    a. Assume the spatial candidates and TMVP candidate are inserted into a merge candidate list in a certain order. The ATMVP candidate may be inserted in any relatively fixed position of those candidates.
        i. In one alternative, for example, the ATMVP candidate can be inserted in the merge candidate list after the first two spatial candidates e.g., A1 and B1;
        ii. In one alternative, for example, the ATMVP candidate can be inserted after the first three spatial candidates e.g., A1 and B1 and B0;
        iii. In one alternative, for example, the ATMVP candidate can be inserted after the first four candidates e.g., A1, B1, B0, and A0.
        iv. In one alternative, for example, the ATMVP candidate can be inserted right before the TMVP candidate.
        v. In one alternatively, for example, the ATMVP candidate can be inserted right after the TMVP candidate.
    b. Alternatively, the position of ATMVP candidate in the candidate list can be signaled in the bitstream. The positions of other candidates, including the TMVP candidate can be additionally signaled.
2. Availability check of the ATMVP candidate can apply by accessing just one set of motion information. When such set of information is unavailable, e.g., one block being intra-coded, the whole ATMVP candidate is considered as unavailable. In that case, the ATMVP will not be inserted into the merge list.
    a. A center position, or a center sub-PU is used purely to check the availability of the ATMVP candidate. When a center sub-PU is used, the center sub-PU is chosen to be the one that covers the center position (e.g., the center 3 position, with a relative coordinate of (W/2, H/2) to the top-left sample of the PU, wherein W×H is the size of the PU). Such a position or center sub-PU may be used together with the temporal vector to identify a corresponding block in the motion source picture. A set of motion information from the block that covers the center position of a corresponding block is identified.
3. Representative set of motion information for the ATMVP coded PU from a sub-PU.
    a. To form the ATMVP candidate the representative set of motion information is first formed.
    b. Such a representative set of motion information may be derived from a fixed position or fixed sub-PU. It can be chosen in the same way as that of the set of motion information used to determine the availability of the ATMVP candidate, as described in bullet #2.
    c. When a sub-PU has identified its own set of motion information and is unavailable, it is set to be equal to the representative set of motion information.
    d. If the representative set of motion information is set to be that of a sub-PU, no additional motion storage is needed at the decoder side for the current CTU or slice in the worst-case scenario.
    e. Such a representative set of motion information is used in all scenarios when the decoding processes requires the whole PU to be represented by one set of motion information, including pruning, such that the process is used to generate combined bi-predictive merging candidates.
4. The ATMVP candidate is pruned with TMVP candidate and interactions between TMVP and ATMVP can be considered; detailed techniques are listed below:
    a. The pruning of a sub-PU based candidate, e.g., ATMVP candidate with a normal candidate, may be conducted by using the representative set of motion information (as in bullet #3) for such a sub-PU based candidate. If such set of motion information is the same as a normal merge candidate, the two candidates are considered as the same.
    b. Alternatively, in addition, a check is performed to determine whether the ATMVP contains multiple different sets of motion information for multiple sub-Pus; if at least two different sets are identified, the sub-PU based candidate is not used for pruning, i.e., is considered to be different to any other candidate; Otherwise, it may be used for pruning (e.g., may be pruned during the pruning process).
    c. Alternatively, in addition, the ATMVP candidate may be pruned with the spatial candidates, e.g., the left and top ones only, with positions denoted as A1 and B1.

d. Alternatively, only one candidate is formed from temporal reference, being either ATMVP candidate or TMVP candidate. When ATMVP is available, the candidate is ATMVP; otherwise, the candidate is TMVP. Such a candidate is inserted into the merge candidate list in a position similar to the position of TMVP. In this case, the maximum number of candidates may be kept as unchanged.
  i. Alternatively, TMVP is always disabled even when ATMVP is unavailable.
  ii. Alternatively, TMVP is used only when ATMVP is unavailable.
e. Alternatively, when ATMVP is available and TMVP is unavailable, one set of motion information of one sub-PU is used as the TMVP candidate. In this case, furthermore, the pruning process between ATMVP and TMVP is not applied.
f. Alternatively, or additionally, the temporal vector used for ATMVP may be also used for TMVP, such that the bottom-right position or center 3 position as used for current TMVP in HEVC do not need to be used.
  i. Alternatively, the position identified by the temporal vector and the bottom-right and center 3 positions are jointly considered to provide an available TMVP candidate.

5. Multiple availability checks for ATMVP are supported to give higher chances for the ATMVP candidate to be more accurate and efficient. When the current ATMVP candidate from the motion source picture as identified by the first temporal vector (e.g., as shown in FIG. 9) is unavailable, other pictures can be considered as motion source picture. When another picture is considered, it may be associated with a different second temporal vector, or may be associated simply with a second temporal vector scaled from the first temporal vector that points to the unavailable ATMVP candidate.
  a. A second temporal vector can identify an ATMVP candidate in a second motion source picture and the same availability check can apply. If the ATMVP candidate as derived from the second motion source picture is available, the ATMVP candidate is derived and no other pictures need to be checked; otherwise, other pictures as motion source pictures need to be checked.
  b. Pictures to be checked may be those in the reference picture lists of the current picture, with a given order. For each list, the pictures are checked in the ascending order of the reference index. List X is first checked and pictures in list Y (being 1-X) follows.
    i. List X is chosen so that list X is the list that contains the co-located picture used for TMVP.
    ii. Alternatively, X is simply set to be 1 or 0.
  c. Pictures to be checked are those identified by motion vectors of the spatial neighbors, with a given order.

6. A partition of the PU that the current ATMVP apply to may be 2N×2N, N×N, 2N×N, N×2N or asymmetric motion partition (AMP) partitions, such as 2N×N/2.
  a. Alternatively, in addition, if other partition sizes can be allowed, ATMVP can be supported too, and such a size may include e.g., 64×8.
  b. Alternatively, the mode may be only applied to certain partitions, e.g., 2N×2N.

7. The ATMVP candidate is marked as a different type of merge candidate.

8. When identifying a vector (temporal vector as in the first stage) from neighbors, multiple neighboring positions, e.g., those used in merge candidate list construction, can be checked in order. For each of the neighbors, the motion vectors corresponding to reference picture list 0 (list 0) or reference picture list 1 (list 1) can be checked in order. When two motion vectors are available, the motion vectors in list X can be checked first and followed by list Y (with Y being equal to 1−X), so that list X is the list that contains the co-located picture used for TMVP. In ATMVP, a temporal vector is used be added as a shift of any center position of a sub-PU, wherein the components of temporal vector may need to be shifted to integer numbers. Such a shifted center position is used to identify a smallest unit that motion vectors can be allocated to, e.g., with a size of 4×4 that covers the current center position.
  a. Alternatively, motion vectors corresponding to list 0 may be checked before those corresponding to list 1;
  b. Alternatively, motion vectors corresponding to list 1 may be checked before those corresponding to list 0;
  c. Alternatively, all motion vectors corresponding to list X in all spatial neighbors are checked in order, followed by the motion vectors corresponding to list Y (with Y being equal to 1−X). Here, list "X" can be the list that indicates where co-located picture belongs, or just simply set to be 0 or 1.
  d. The order of the spatial neighbors can be the same as that used in HEVC merge mode.

9. When in the first stage of identifying, a temporal vector does not include information identifying a reference picture, the motion source picture as shown in FIG. 9, may be simply set to be a fixed picture, e.g., the co-located picture used for TMVP.
  a. In such a case, the vector may only be identified from the motion vectors that point to such a fixed picture.
  b. In such a case, the vector may only be identified from the motion vectors that point to any picture but further scaled towards the fixed picture.

10. When in the first stage of identifying, a vector consists identifying a reference picture, the motion source picture as shown in FIG. 9, one or more of the following additional checks may apply for a candidate motion vector.
  a. If the motion vector is associated with a picture or slice that is Intra coded, such a motion vector is considered as unavailable and cannot be used to be converted to the vector.
  b. If the motion vector identifies an Intra block (by e.g., adding the current center coordinate with the motion vector) in the associated picture, such a motion vector is considered as unavailable and cannot be used to be converted to the vector.

11. When in the first stage of identifying a vector, the components of the vector may be set to be (half width of the current PU, half height of the current PU), so that it identifies a bottom-right pixel position in the motion source picture. Here (x, y) indicates a horizontal and vertical component of one motion vector.
  a. Alternatively, the components of the vector may be set to be (sum (half width of the current PU, M), sum (half height of the current PU, N)) where the function sum(a, b) returns the sum of a and b. In one example, when the motion information is stored in 4×4 unit, M and N are both set to be equal to 2. In another example, when the motion information is stored in 8×8 unit, M and N are both set to be equal to 4.

12. The sub-block/sub-PU size when ATMVP applies is signaled in a parameter set, e.g., sequence parameter set of picture parameter set. The size ranges from the least PU size to the CTU size. The size can be also predefined or signaled. The size can be, e.g., as small as 4×4. Alternatively, the sub-block/sub-PU size can be derived based on the size of PU or CU. For example, the sub-block/sub-PU can be set equal to max (4×4, (width of CU)>>M). The value of M can be pre-defined or signaled in the bitstream.

13. The maximum number of merge candidates may be increased by 1 due to the fact that ATMVP can be considered as a new merge candidate. For example, compared to HEVC which takes up to 5 candidates in a merge candidate list after pruning, the maximum number of merge candidates can be increased to 6.
    a. Alternatively, pruning with conventional TMVP candidate or unification with the conventional TMVP candidate can be performed for ATMVP such that the maximum number of merge candidates can be kept as unchanged.
    b. Alternatively, when ATMVP is identified to be available, a spatial neighboring candidate is excluded from the merge candidate list, e.g. the last spatial neighboring candidate in fetching order is excluded.
14. When multiple spatial neighboring motion vectors are considered to derive the temporal vector, a motion vector similarity may be calculated based on the neighboring motion vectors of the current PU as well as the neighboring motion vectors identified by a specific temporal vector being set equal to a motion vector. The one that leads to the highest motion similarity may be chosen as the final temporal vector.
    a. In one alternative, for each motion vector from a neighboring position N, the motion vector identifies a block (same size as the current PU) in the motion source picture, wherein its neighboring position N contains a set of the motion information. This set of motion vector is compared with the set of motion information as in the neighboring position N of the current block.
    b. In another alternative, for each motion vector from a neighboring position N, the motion vector identifies a block in the motion source picture, wherein its neighboring positions contain multiple sets of motion information. These multiple sets of motion vector are compared with the multiple sets of motion information from the neighboring positions of the current PU in the same relative positions. A motion information similarity is calculated. For example, the current PU has the following sets of motion information from A1, B1, A0 and B0, denoted as MIA1, MIB1, MIA0 and MIB0. For a temporal vector TV, it identifies a block corresponding to the PU in the motion source picture. Such a block has motion information from the same relative A1, B1, A0 and B0 positions, and denoted as TMIA1, TMIB1, TMIA0 and TMIB0. The motion similarity as determined by TV is calculated as MStv=$\Sigma\_(N\in\{A1,B1,A0,B0\})$ 〖MVSim(〖M〗_N,〖TMI〗_N)〗, wherein MVSim defines the similarity between two sets of motion information.
    c. In both of the above cases, the motion similarity MVSim can be used, wherein the two input parameters are the two sets of motion information, each containing up to two motion vectors and two reference indices. Each pair of the motion vectors in list X are actually associated with reference pictures in different list X of different pictures, the current picture and the motion source picture. For each of the two motion vectors MVXN and TMVXN (with X being equal to 0 or 1), the motion vector difference MVDXN can be calculated as MVXN−TMVXN. Afterwards, the difference MVSimX is calculated as e.g., abs〖(MVDX〗_N[0])+abs〖(MVDX〗_N[1]), or (〖MVDX〗_N [0]*〖MVDX〗_N[0]+〖MVDX〗_N[1]*〖MVDX〗_[1]). If both sets of motion information contain available motion vectors, MVSim is set equal to MVSim0+MVSim1.
        i. In order to have a unified calculation of the motion difference, both of the motion vectors need to be scaled towards the same fixed picture, which can be, e.g., the first reference picture RefPicListX[0] of the list X of the current picture.
        ii. If the availability of the motion vector in list X from the first set and the availability of the motion vector in list X from the second set are different, i.e., one reference index is −1 while the other is not, such two sets of motion information are considered as not similar in direction X. If the two sets are not similar in both sets, the final MVSim function may return a big value T, which may be, e.g., considered as infinite.
        iii. Alternatively, for a pair of sets of motion information, if one is predicted from list X (X being equal to 0 or 1) but not list Y (Y being equal to 1−X) and the other has the same status, a weighting between 1 and 2 (e.g., MVSim is equal to MVSimX*1.5) may be used. When one set is only predicted from list X and the other is only predicted from list Y, MVSim is set to the big value T.
        iv. Alternatively, for any set of motion information, as long as one motion vector is available, both motion vectors will be produced. In the case that only one motion vector is available (corresponding to list X), it is scaled to form the motion vector corresponding to the other list Y.
    d. Alternatively, the motion vector may be measured based on differences between the neighboring pixels of the current PU and the neighboring pixels of the block (same size as the current PU) identified by the motion vector. The motion vector that leads to the smallest difference may be chosen as the final temporal vector.
15. When deriving the temporal vector of the current block, motion vectors and/or temporal vectors from neighboring blocks that are coded with ATMVP may have a higher priority than motion vectors from other neighboring blocks.
    a. In one example, only temporal vectors of neighboring blocks are checked first, and the first available one can be set to the temporal vector of the current block. Only when such temporal vectors are not present, normal motion vectors are further checked. In this case, temporal vectors for ATMVP coded blocks need to be stored.
    b. In another example, only motion vectors from ATMVP coded neighboring blocks are checked first, and the first available one can be set to the temporal vector of the current block. Only when such temporal vectors are not present, normal motion vectors are further checked.
    c. In another example, only motion vectors from ATMVP coded neighboring blocks are checked first, and the first available one can be set to the temporal vector of the current block. If such motion vectors are not available, the checking of temporal vector continues similar as in bullet 15a.
d. In another example, temporal vectors from neighboring blocks are checked first, the first available one can be set to the temporal vector of the current block. If such motion vectors are not available, the checking of temporal vector continues similar as in bullet 15b.
e. In another example, temporal vectors and motion vectors of ATMVP coded neighboring blocks are checked first, the first available one can be set to the temporal vector of the current block. Only when such temporal vectors and motion vectors are not present, normal motion vectors are further checked.

16. When multiple spatial neighboring motion vectors are considered to derive the temporal vector, a motion vector may be chosen so that it minimizes the distortion that is calculated from the pixel domain, e.g., template matching may be used to derive the temporal vector such that the one leads to minimal matching cost is selected as the final temporal vector.

17. Derivation of a set of motion information from a corresponding block (in the motion source picture) is done in a way that when a motion vector is available in the corresponding block for any list X (denote the motion vector to be MVX), for the current sub-PU of the ATMVP candidate, the motion vector is considered as available for list X (by scaling the MVX). If the motion vector is unavailable in the corresponding block for any list X, the motion vector is considered as unavailable for list X.
   a. Alternatively, when motion vector in the corresponding block is unavailable for list X but available for list 1−X (denoted 1−X by Y and denote the motion vector to be MVY), the motion vector is still considered as available for list X (by scaling the MVY towards the target reference picture in list X).
   b. Alternatively, or in addition, when both motion vectors in the corresponding block for list X and list Y (equal to 1−X) are available, the motion vectors from list X and list Y are not necessary used to directly scale and generate the two motion vectors of a current sub-PU by scaling.
      i. In one example, when formulating the ATMVP candidate, the low-delay check as done in TMVP applies to each sub-PU. If for every picture (denoted by refPic) in every reference picture list of the current slice, picture order count (POC) value of refPic is smaller than POC of current slice, current slice is considered with low-delay mode. In this low-delay mode, motion vectors from list X and list Y are scaled to generate the motion vectors of a current sub-PU for list X and list Y, respectively. When not in the low-delay mode, only one motion vector MVZ from MVX or MVY is chosen and scaled to generate the two motion vectors for a current sub-PU. Similar to TMVP, in such a case Z is set equal to collocated_from_l0_flag, meaning that it depends on whether the co-located picture as in TMVP is in the list X or list Y of the current picture. Alternatively, Z is set as follows: if the motion source picture is identified from list X, Z is set to X. Alternatively, in addition, when the motion source pictures belong to both reference picture lists, and RefPicList0[idx0] is the motion source picture that is first present in list 0 and RefPicList(1)[idx1] is the motion source picture that is first present in list 1, Z is set to be 0 if idx0 is smaller than or equal to idx1, and set to be 1 otherwise.

18. The motion source picture may be signaled, e.g., generated by video encoder 20 in a coded bitstream. In detail, a flag indicating whether the motion source picture is from list 0 or list 1 is signaled for a B slice. Alternatively, in addition, a reference index to a list 0 or list 1 of the current picture may be signaled to identify the motion source picture.

When identifying a temporal vector, a vector is considered as unavailable (thus other ones can be considered) if it points to an Intra coded block in the associated motion source picture.

Figure 11:
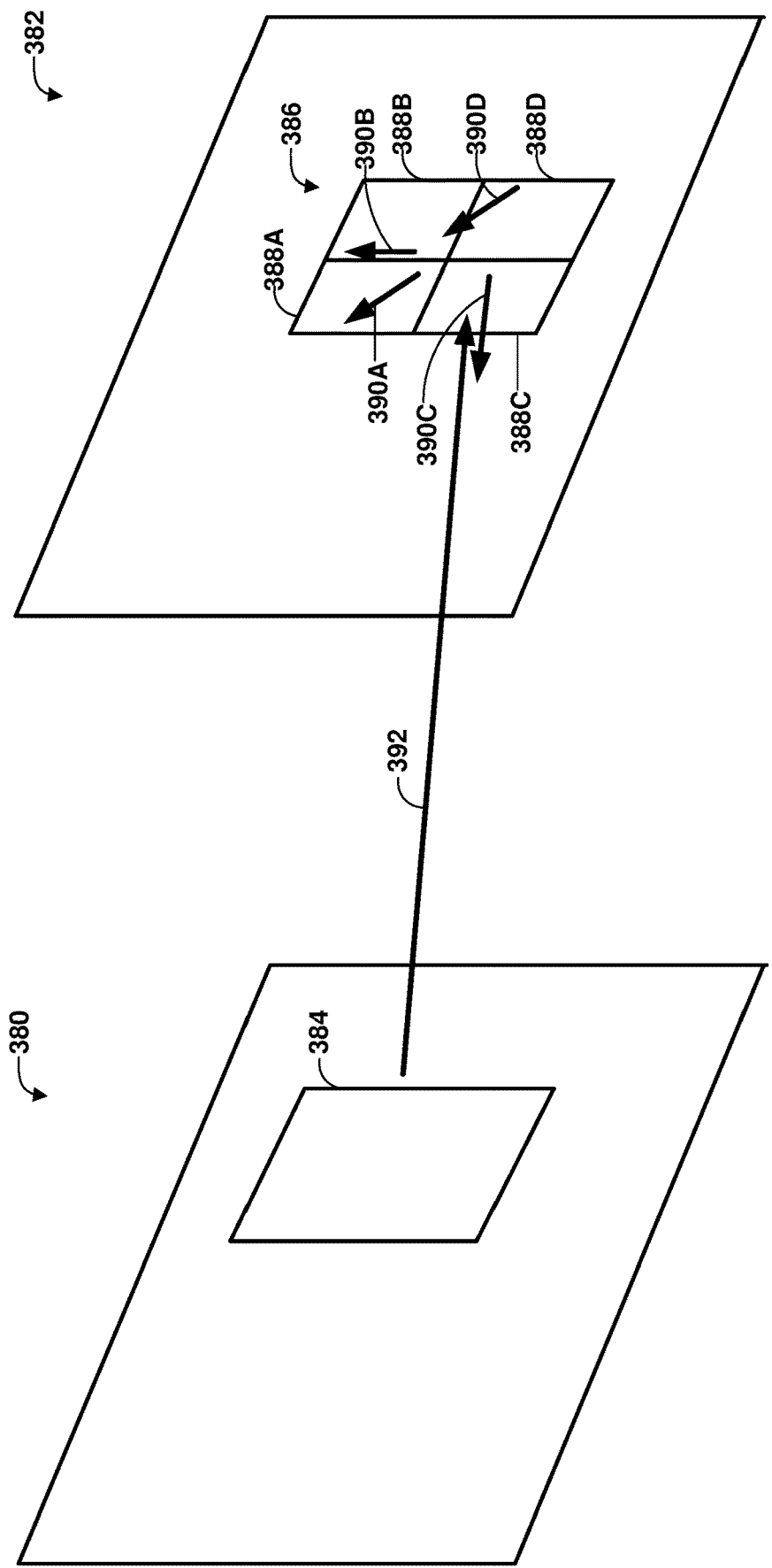
FIG. 11 is a conceptual diagram illustrating sub-PU motion prediction from a reference picture.

FIG. 11 is a conceptual diagram illustrating sub-PU motion prediction from a reference picture. In this example, current picture 380 includes a current PU 384 (e.g., a PU). In this example, motion vector 392 identifies PU 386 of reference picture 382 relative to PU 384. PU 386 is partitioned into sub-PUs 388A-388D, each having respective motion vectors 390A-390D. Thus, although current PU 384 is not actually partitioned into separate sub-PUs, in this example, current PU 384 may be predicted using motion information from sub-PUs 388A-388D. In particular, a video coder may code sub-PUs of current PU 384 using respective motion vectors 390A-390D. However, the video coder need not code syntax elements indicating that current PU 384 is split into sub-PUs. In this manner, current PU 384 may be effectively predicted using multiple motion vectors 390A-390D, inherited from respective sub-PUs 388A-388D, without the signaling overhead of syntax elements used to split current PU 384 into multiple sub-PUs.

Figure 12:
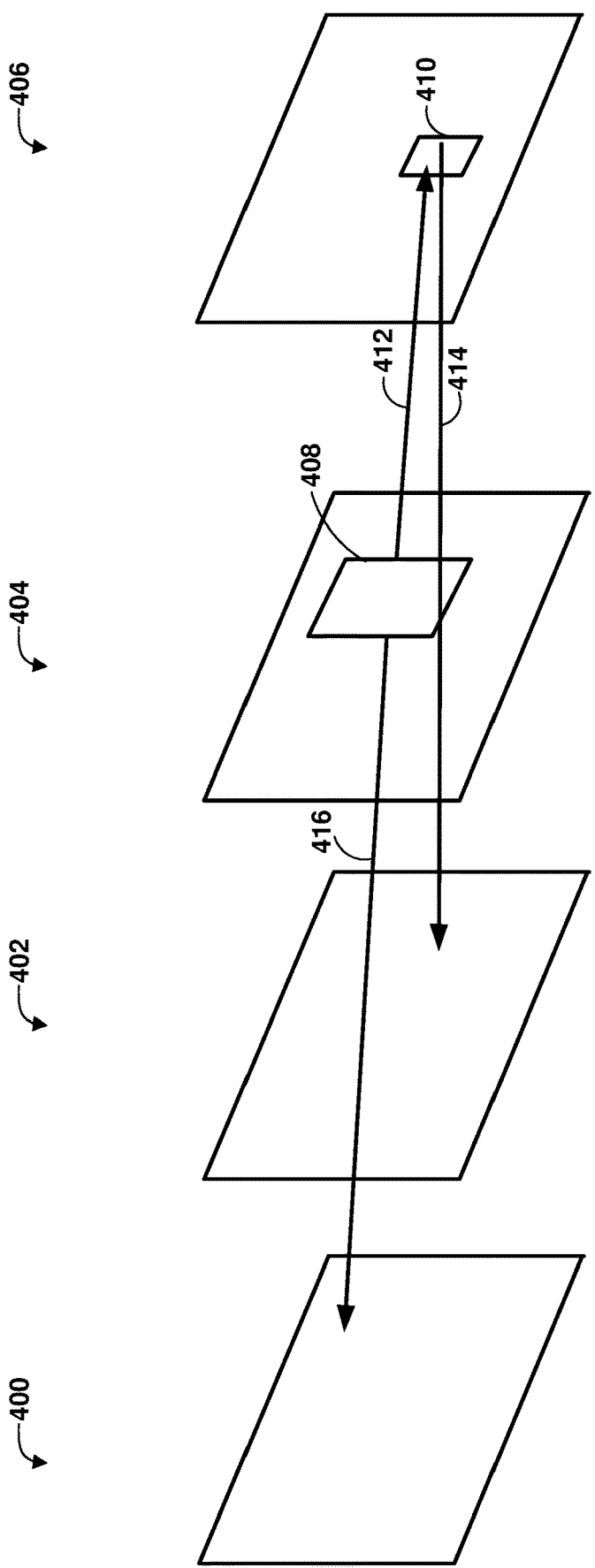
FIG. 12 is a conceptual diagram illustrating relevant pictures in ATMVP.

FIG. 12 is a conceptual diagram illustrating relevant pictures in ATMVP (similar to TMVP). In particular, FIG. 12 illustrates current picture 404, motion source picture 406, and reference pictures 400 and 402. More particularly, current picture 404 includes current block 408. Temporal motion vector 412 identifies corresponding block 410 of motion source picture 406 relative to current block 408. Corresponding block 410, in turn, includes motion vector 414, which refers to reference picture 402 and acts as an advanced temporal motion vector predictor for at least a portion of current block 408, e.g., a sub-PU of current block 408. That is, motion vector 414 may be added as a candidate motion vector predictor for current block 408. If selected, at least a portion of current block 408 may be predicted using a corresponding motion vector, namely, motion vector 416, which refers to reference picture 400.

Figure 13:
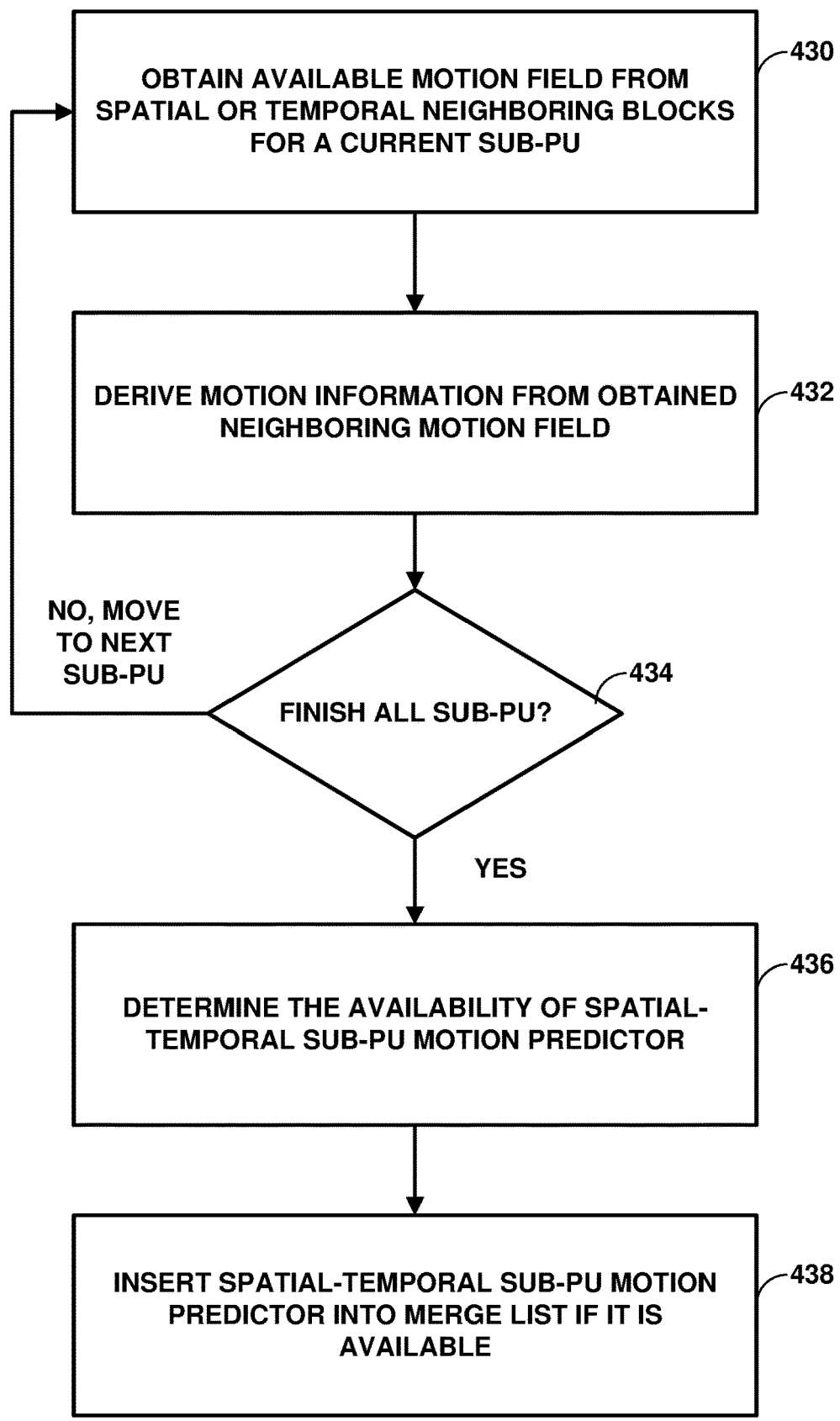
FIG. 13 is a flowchart showing an example method according to the techniques of this disclosure.

Sub-PU related techniques for HEVC are also described in U.S. application Ser. No. 15/176,790, filed Jul. 9, 2016, the entire content of both of which is incorporated by reference herein. To enhance the performance using sub-PU motion prediction, spatial-temporal motion information of neighboring sub-PU's (ATMVP_EXT) are exploited. In this example, the motion vector for each sub-PU is derived from the information of neighboring blocks in three-dimensional domain. This means that the neighboring blocks could be the spatial neighbors in the current picture or temporal neighbors in previous coded pictures. FIG. 13 shows the flow chart of the spatial-temporal motion vector predictor (STMVP) derivation process. Besides what is described below, the methods described above for ATMVP (e.g., bullet #1, #2, #3, #4, #6, #7, #12, #13) could be directly extended to STMVP.

As shown in FIG. 13, video encoder 20 and/or video decoder 30 may be configured to obtain the available motion field from spatial or temporal neighboring blocks for a current sub-PU (430). In this context, the motion field is the collection of motion vectors that were selected as the best for spatially/temporally neighboring blocks. For example, blocks located to the left of or above current block are already coded and the best motion vectors are available before coding the current sub-PU. The available motion information from neighboring blocks is identical in both video encoder 20 and video decoder 30. The motion information includes of one or two 3-dimentional vectors (MVx, Mvy, temporal direction): one vector for uni-prediction and two vectors for bi-prediction. Video encoder 20 and/or video decoder 30 may then derive motion information from the obtained neighboring motion field (432). Video encoder 20 and/or video decoder 30 then determine if all of the sub-PUs have been processed (434). If no, video encoder 20 and/or video decoder 30 move to the next sub-PU. If yes, video encoder 20 and/or video decoder 30 may determine the availability of spatial-temporal sub-PU motion predictors (436). If available, video encoder 20 and/or video decoder 30 insert spatial-temporal sub-PU motion predictors into the merge list.

In the following description, the term "block" is used to refer the block-unit for storage of prediction related info, e.g. inter or intra-prediction, intra-prediction mode, motion information etc. Such prediction info is saved and may be used for coding future blocks, e.g. predicting the prediction mode information for future blocks. In AVC and HEVC, the size of such a block is 4×4. It is noted that in the following description, we use 'PU' to indicate the inter-coded block unit and sub-PU to indicate the unit that derives the motion information from neighbouring blocks. Any combination of the following techniques may be applied.

Figure 14:
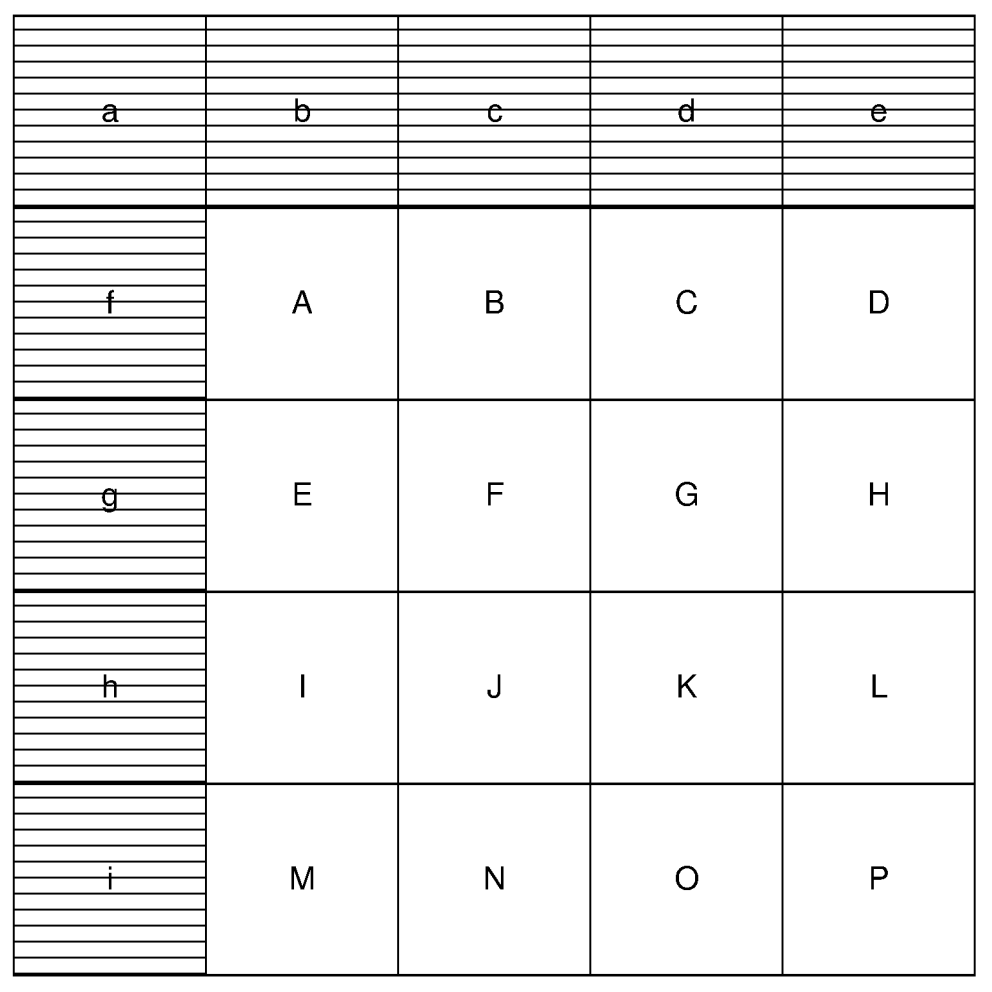
Figure 15:
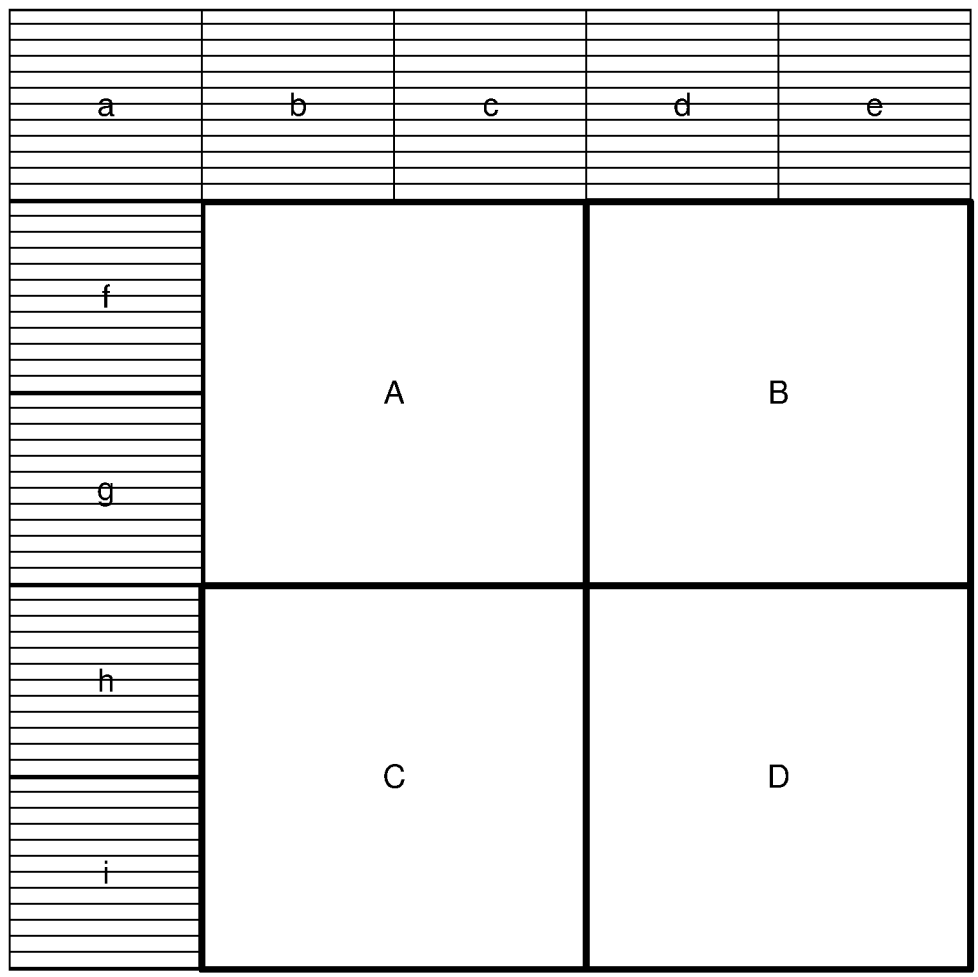
FIG. 15 is a conceptual diagram showing another example of a PU and neighboring blocks.

In one example, video encoder 20 and/or video decoder 30 may be configured to obtain motion information from neighboring blocks. Sub-PUs and neighboring blocks may have different sizes. Consider a PU with multiple sub-PUs. The size of a sub-PU is usually equal to or bigger than that neighboring block size. In one example, as shown in FIG. 14, the hashed squares represent neighboring blocks (a, b, . . . i) that are outside of the current PU, and the remaining, non-hashed squares (A,B, . . . P) represent the sub-PUs in the current PU. As shown in FIG. 14, the sizes of sub-PUs and its neighboring blocks are the same. In one example, the sizes of the sub-PUs are equal to 4×4, though different sized sub-PUs may be used. FIG. 15 shows another example where the sub-PUs are bigger than the neighboring blocks. In other examples, sub-PUs may take non-square shapes, such as rectangle, or triangle. In some example, the size of sub-PU may be signaled in a slice header.

In other examples, the process in bullet #12 of the discussion above related to ATMPV can be extended to STMVP. For example, the sub-block/sub-PU size when STMVP applies is signaled in a parameter set, e.g., sequence parameter set of picture parameter set. The size ranges from the least PU size to the CTU size. The size can be also pre-defined or signaled. The size can be, e.g., as small as 4×4. Alternatively, the sub-block/sub-PU size can be derived based on the size of PU or CU. For example, the sub-block/sub-PU can be set equal to max (4×4, (width of CU)>>M). The value of M can be pre-defined or signaled in the bitstream.

Different checking orders of sub-PUs may be used in STMVP. In the example of FIG. 14, assume a raster scan order (A, B, C, D, E . . . ) is applied to sub-PUs for their motion prediction derivation in the following description. However, other scan orders may be applied also and it should be noted that the techniques of this disclosure are not limited to raster scan order only.

In STMVP, neighboring blocks may be classified into two different types: spatial and temporal. A spatial neighboring block is an already coded block or an already scanned sub-PU that is in the current picture or slice and neighboring to the current sub-PU. A temporal neighboring block is a block in the previous coded picture and neighboring to the co-located block of the current sub-PU. In one example, all the reference pictures associated with current PU are used to obtain the temporal neighboring block. In another example, a sub-set of reference pictures are used for STMVP derivation. For example, only the first entry of each reference picture list is used.

Following this definition, with reference to FIG. 14, for sub-PU (A), all neighboring blocks (a, b, . . . i) and their collocated blocks in previous coded pictures are spatial and temporal neighboring blocks that are treated as available. According to raster scan order, blocks B, C, D, E . . . P are not spatially available. Though, all sub-PUs (from A to P) are temporally available neighboring blocks for sub-PU (A), because their motion information can be found in their collocated blocks in previous coded pictures. Take sub-PU (G) as another example, its spatial neighboring blocks that are available include those from a, b . . . to i, and also from A to F. In some examples, certain restrictions may be applied to the spatial neighbouring blocks, such as the spatial neighbouring blocks (i.e., from a, b . . . to i) shall be in the same LCU/slice/tile.

Video encoder 20 and/or video decoder 30 selects a subset of all available neighboring blocks to derive motion information or motion field for each sub-PU. The subset used for derivation of each PU may be pre-defined. In other examples, the subset used for derivation may be signaled as high level syntax in a slice header, picture parameter set (PPS), and/or a sequence parameter set (SPS). To optimize the coding performance, the subset may be different for each sub-PU. In practice, a fixed pattern of location for the subset is preferred for simplicity. For example, each sub-PU may use its immediate above spatial neighbor, its immediate left spatial neighbor and its immediate bottom-right temporal neighbor as the subset. As shown in FIG. 14, when considering sub-PU (J), the block above (F) and the block left (I) are spatially available neighboring blocks and the bottom-right block (O) is temporally available neighboring block. With such a subset, sub-PUs in the current PU are processed sequentially due to processing dependency.

To allow paralleling processing of each sub-PU in the current PU, a different subset of neighboring blocks may be defined and used. In one example, a subset only contains spatial neighbor blocks that do not belong to the current PU, e.g. blocks a,b, . . . i. In this case, parallel processing would be possible. In another example, for a given sub-PU, if its spatial neighboring block is within the current PU, the collocated block of that spatial neighboring block may be put in the subset and used to derive the motion information of the current sub-PU. For example, when considering sub-PU (J), the temporal collocated blocks of the above block (F) and the left block (I) and bottom-right block (O) are selected as the subset to derive the motion of the sub-PU (J). In this case, the subset for sub-PU (J) contains three temporal neighboring blocks. In another example, partially-paralleling process may be enabled wherein one PU is split into several regions and each region (covering several sub-PUs) could be processed independently.

Sometimes the neighboring blocks are intra coded, wherein it is desirable to have a rule to determine replacement motion information for those blocks for better motion prediction and coding efficiency. For example, considering sub-PU (A), there might be cases where blocks b, c, f are intra-coded, and a, d, e, g, h, i are inter-coded.

For spatial neighbors, a pre-defined order may be used to populate the motion information of intra-coded blocks with that of the first found inter coded block. For example, the searching order of the above neighbors can be set as starting from the immediate above neighbor rightward until the rightmost neighbor, meaning the order of b, c, d, and e. The search order of the left neighbors can be set as starting from the immediate left neighbor downward until the bottommost neighbor. In this example, the order is f, g, h, and then i. If no inter-coded block is found through the search process, then the above or left spatial neighbor is considered unavailable.

For temporal neighbors, the same rule as specified in the TMVP derivation can be used. However, it should be noted that other rules can also be used, e.g. rules based on motion direction, temporal distance (search in different reference pictures) and spatial locations, etc.

Video encoder 20 and/or video decoder 30 may then derive motion information for a given sub-PU. As part of this process, video encoder 20 and/or video decoder 30 may perform target reference picture determination and motion vector scaling. For neighboring blocks, motion vector scaling may be applied to the motion vector associated with the neighboring block based on each reference picture list in order to map all the neighboring blocks' motion vectors to a same reference picture in each list. There may be two steps in the example: first, determine a source motion vector which we use for scaling; second, determine a target reference picture where the source motion vector is projected to.

For the first step, several methods can be used.

(a) For each reference list, motion vector scaling is independent from motion vectors in another reference list. For a given block's motion information, if there is no motion vector in a reference list (e.g., uni-prediction mode instead of bi-prediction mode), no motion vector scaling is performed for that list.

(b) Motion vector scaling is not independent from motion vectors in another reference list. For a given block's motion information, if no motion vector is unavailable in a reference list, the motion vector can be scaled from a motion vector in another reference list.

(c) Both motion vectors are scaled from one pre-defined reference list (as in TMVP mentioned above).

As one example, method (a) is used for scaling motion vectors of spatial neighboring blocks, and method (c) is used for scaling motion vectors of temporal neighboring blocks.

As for the second step, video encoder 20 and/or video decoder 30 may select the target reference picture according to a certain rule based on the motion information (e.g., reference pictures) of available spatial neighboring blocks. One example of such a rule is the majority rule, i.e. selecting the reference picture shared by majority of the blocks. In this case, there is no signaling needed for the target reference picture from the encoder to decoder because the same information can also be inferred at decoder side using the same rule. Alternatively, such a reference picture may also be specified explicitly in slice header, or signaled in some other methods to decoder. The target reference picture is determined as the first reference picture (refidx=0) of each reference list.

Video encoder 20 and/or video decoder 30 may be configured to derive motion information for a given sub-PU. After retrieving motion information from neighboring blocks, as illustrated in the previous section, and performing a motion scaling process (if needed), the motion information of the current sub-PU is derived. Assume there are N available neighboring blocks with motion information for one given sub-PU. First, the prediction direction (InterDir) is be determined. An example method is as follows:

a. InterDir is initialized as zero, then looping through the motion information of N available neighboring blocks;

b. InterDir=(InterDir bitwiseOR 1), if there is at least one motion vector in List 0;

c. InterDir=(InterDir bitwiseOR 2), if there is at least one motion vector in List 1.

Here "bitwiseOR" represent the bitwise OR operation. The value of InterDir is defined as: 0 (no inter prediction), 1 (inter prediction based on List 0), 2 (inter prediction based on List 1), and 3 (inter prediction based on both List 0 and List 1).

In another example, similar to the determination on target reference picture for motion vector scaling described above, the majority rule may be used to determine the value of InterDir for the given sub-PU based on all available neighboring blocks' motion information.

After InterDir is determined, motion vectors may be derived. For each reference list based on the derived InterDir, there may be M motion vectors (M<=N) available through motion vector scaling to a target reference picture as described above. The motion vector for the reference list can be derived as:

$$(MV_x, MV_y) = ((\Sigma_{i=0}^{M} w_i * MV_{xi} + O_i)/\Sigma_{i=0}^{M} w_i, (\Sigma_{j=0}^{M} w_j * MV_{yj} + O_j)/\Sigma_{j=0}^{M} w_j)$$

where $w_i$ and $w_j$ are the weighting factors for the horizontal and the vertical motion component respectively, and $O_i$ and $O_j$ are the offset values that are dependent on the weighting factors.

The weighting factors may be determined based on various factors. In one example, the same rule may be applied to all sub-PUs within one PU. The rule may be defined as follows. For example, the weighting factor can be determined based on the location distance of the current sub-PU and a corresponding neighboring block. In another example, the weighting factor can also be determined based on the POC distance between the target reference picture and the reference picture associated with a corresponding neighboring block's motion vector before scaling. In yet another example, the weighting factor may be determined based on motion vector difference or consistency. For simplicity, all the weighting factors may also be set to 1.

In another example, different rules may be applied to sub-PUs within one PU. For example, the above rule may be applied, in addition, for sub-PUs located at the first row/first column, the weighting factors for motion vectors derived from temporal neighboring blocks are set to 0 while for the remaining blocks, the weighting factors for motion vectors derived from spatial neighboring blocks are set to 0.

It should be noted that in practice, the equations above may be implemented as it is, or simplified for easy implementation. For example, to avoid division or floating point operation, fixed point operation may be used to approximate the equation above. One instance is that to avoid divide by 3, one may instead choose to multiply with 43/128 to replace division operation with multiplication and bit-shift. Those variations in implementation should be considered covered under the same spirit of the techniques of this disclosure.

Alternatively, non-linear operation may be also applied to derive the motion vectors, such as median filter.

Video encoder 20 and/or video decoder 30 may also be configured to perform an availability check during the candidate list construction process for STMVP. It is proposed that even if the motion vector predictors of each sub-PU are available, the STMVP mode may be reset to be unavailable for one PU. For example, once a motion vector predictor of each sub-PU is derived for a given PU, some availability checks are performed to determine if STMVP mode should be made available for the given PU. Such an operation is used to eliminate the cases where it is very unlikely for STMVP mode to be finally chosen for a given PU. When STMVP mode is not available, mode signaling does not include STMVP. In case that STMVP mode is implemented by inserting SMTVP in merge list, the merge list doesn't include this STMVP candidate when STMVP mode is determined to be not available. As a result, signaling overhead may be reduced.

Consider one PU partitioned into M sub-PUs. In one example, if N1 (N1<=M) sub-PUs among the M sub-PUs has the same motion vector predictor (i.e., same motion vectors and same reference picture indices), STMVP is only made available when N1 is smaller than a threshold or the predictor is different from other motion vector predictors (with smaller merge index) in the merge list. In another example, if N2 (N2<=M) sub-PUs under STMVP mode share the same motion vector predictors as corresponding sub-PUs under ATMVP, STMVP is only made available when N2 is smaller than another threshold. In one example of this disclosure, both thresholds for N1 and N2 are set equal to M.

If STMVP is available, video encoder 20 and/or video decoder 30 inserts the STMPV candidate in to the into the merge list. The process in bullet #1 for ATMVP above can be extended and an STMVP candidate can be inserted either before or after an ATMVP candidate. In one example, an STMVP candidate is inserted right after the ATMVP candidate in the merge list.

POC-based MV pruning techniques are described in U.S. application Ser. No. 15/431,321, filed Feb. 13, 2017, the entire content of which is incorporated by reference herein. To maximize the efficiency of MV prediction, the uniqueness of available MVs may be examined. Otherwise, redundant MVs would lead to inefficient resource utilization such as wasting a bit budget or resources of target devices. Thus, eliminating the redundancy of MV candidates, so called pruning, may be an important step to keep MVs as unique and diverse as possible to provide more meaningful MV candidates in MV prediction.

This disclosure describes a POC-based pruning that has the three main strengths: (1) higher accuracy, (2) simplicity, and (3) universality. The proposed technique has higher pruning accuracy because it can detect redundant MVs that were not captured by existing pruning methods. In addition, it is simple since no additional complexity is required. Lastly, POC-based pruning is universal in the sense that it can be applied to versatile situations, e.g. spatial MVs for ATMVP/merge candidates, sub-PU (ATMVP and STMVP) MVs, TMVP, combined MV, and even zero MV.

TABLE 1

Possible pairs of MVs that POC-based pruning applies.

| Category # | | Candidate 1 | Candidate 2 |
|---|---|---|---|
| non sub-PU MVs | C1 | MV[0] of PU | MV[1] of PU |
| sub-PU MVs | C2 | MV[0][j] of sub-PU within PU | MV[1][k] of sub-PU within PU |
| | C3 | MV[0][j] of sub-PU within PU | MV[1] of non sub-PU |
| | C4 | MVs of sub-PUs | MVs of sub-PUs |
| Bi-MV construction | C5 | MV from L0 in PU | MV from L1 in PU |
| | C6 | MV from L0 in sub-PU | MV from L1 in sub-PU |

Table 1 summarizes what kinds of MV pairs can be pruned using a POC-based method. In category C1, MVs from regular PUs (not sub-PUs) are compared. The comparison may be between either two uni-MVs (e.g., motion vectors for uni-prediction) or two bi-MVs (e.g., motion vector for bi-prediction). From C2 to C4, sub-PU MV(s) is (are) included in the comparison. In C2, POC-based pruning is used to determine whether the sub-PU MVs within a PU are all identical. This can be handled by applying the same techniques in C1 to MV's from the sub-PUs. The situation when all sub-PU MVs are equal falls into C3, where a MV represents all the MVs from the sub-PUs, hence the same comparison as in C1 is applied. But, if all sub-PU MVs of a candidate are not equal, and there exists another candidate having sub-PU MVs, C4, POC-based pruning is applied to each pair of MVs from sub-PUs located at the same position within the PU. Both C5 and C6 are related to bi-MV construction by combining two uni-MVs: one from L0 and another from L1. If the two uni-MVs are identical (e.g., same MV from same reference picture), no bi-MV construction is required because the resulting bi-MV will be same as the uni-MV. Thus, POC-based pruning can help to save resources by detecting identical MVs more precisely especially when L0 and L1 have same reference pictures.

For a given list of candidates, two factors that may determine the efficiency of the merge candidate list is (1) ordering of the candidate list (e.g., how to assign the order of the candidates in the list) and (2) pruning (e.g., removing the redundancy among those candidates). In general, it is preferred to have the most likely chosen candidate to be first in order in the candidate list, as the index to the first candidate may be signaled with fewer. Also, having more varied candidates in the list (e.g., less redundancy) increases the chances that a more accurate motion vector is present among the candidates in the list.

The techniques of this disclosure include techniques for determining a set of merge candidates from a larger group of possible candidates. In addition, this disclosure describes techniques for adaptive selection, ordering and pruning of merge candidates to achieve higher efficiency of the motion vector candidate list. For adaptive ordering, the proposed techniques exploit additional MV information to assign higher priority (e.g., resulting in smaller indices in the list), to the candidates with a higher likelihood to have more accurate motion information. For adaptive pruning, a motion vector difference (MVD) may be used to determine if two MV's are identical (or very close) by comparing MVD's to an adaptive threshold.

Owing to the flexibility of the proposed techniques, the techniques of this disclosure may be applied to most of existing state-of-the-art codecs, such as H.264, HEVC, or H.266, and can be easily extend to different partitioning frameworks, such as the QTBT structure described above. In addition, different combinations of the proposed techniques can be combined into a desired solution for specific applications. That is, the techniques below may be applied independently or in any non-mutually-exclusive combination.

In addition, the proposed techniques below may be performed without additional signaling, other than the merge index as in HEVC or H.266 reference software. That is, in some examples, video encoder 20 and video decoder 30 may be configured to perform the techniques below based on a set of predetermined rules, and without the use of explicit signaling. Video encoder 20 may be configured to signal a merge index for the current block and video decoder 30 may be configured to perform the same procedure to derive merge candidates as does video encoder 20. Thus, with the received merge index, video decoder 30 may be configured to determine the identical MV information without any mismatch.

Figure 16:
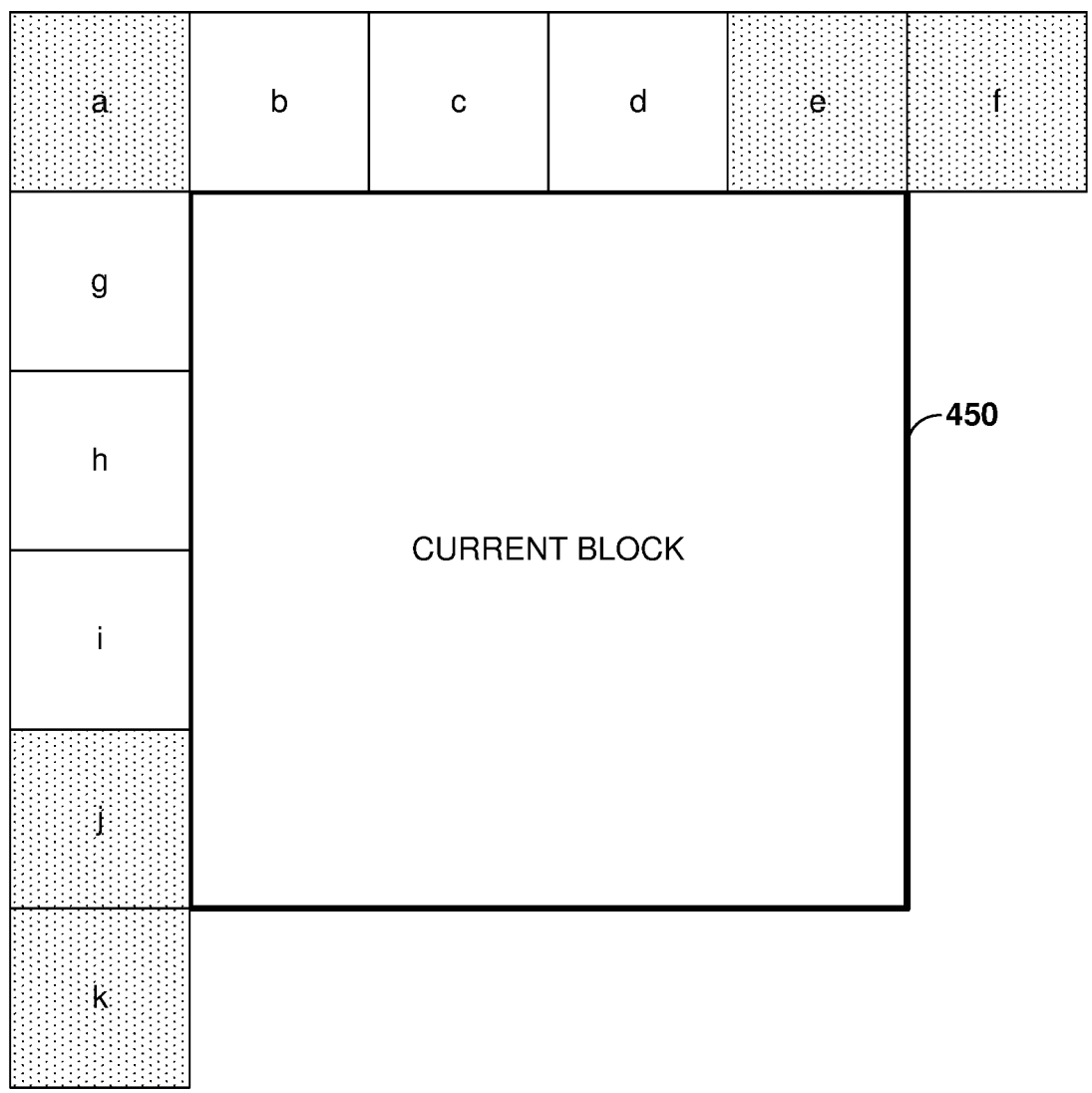
FIG. 16 is a conceptual diagram showing another example of a PU and neighboring blocks.

FIG. 16 shows an example set of neighboring blocks for current block 450. As shown in FIG. 16, shaded neighboring blocks a, e, f, j, and k are the same as those used as spatial merge candidates in HEVC. This disclosure proposes using motion information from additional neighboring blocks that are coded before current block 450. Such additional neighboring blocks may include neighboring blocks b, c, d, g, h, and i. By deriving a final motion vector candidate list from more neighboring blocks, the likelihood that a more accurate motion vector is among the motion vector candidate list is increased.

In the example of FIG. 16, current block 450 is a 16×16, and each of the neighboring blocks is a 4×4 block. However, note that the neighboring blocks may be of different sizes based on the size of the current block. In general, video encoder 20 and video decoder 30 may be configured to construct a motion vector candidate list of candidates for the current block 450, where the motion vector candidate list contains motion vector information from a number of neighboring blocks relative to the current block, wherein the number of neighboring blocks is greater than 5.

In another example of the disclosure, video encoder 20 and video decoder 30 may be configured to construct a motion vector candidate list using motion vector histogram-based ordering of motion information from the neighboring blocks. Based on the assumption that motion is spatially homogeneous (e.g., likely to be the same or close the same in a given spatial location in a picture), the dominant motion information of neighboring blocks is more likely to be the motion information selected for the current block. Accordingly, video encoder 20 and video decoder 30 may be configured to derive a motion vector histogram from the motion vector distribution of neighboring blocks. As discussed above, the motion vector information includes a three-dimensional vector (MVx, MVy, direction), where MVx is the horizontal component of the motion vector, MVy is the vertical component of the motion vector, and where direction refers to either past (reference list L0) or future (reference list L1) prediction direction. Referring to FIG. 13, video encoder 20 and video decoder 30 may determine how often a particular motion vector is the same for each of neighboring blocks a-k.

Video encoder 20 and video decoder 30 may use the histogram information in multiple different ways. In one example, video encoder 20 and video decoder 30 may use the histogram information to determine which motion vectors, and hence which neighboring blocks may be used as spatial merge candidates in the candidate list. In another example, video encoder 20 and video decoder 30 may use the histogram to determine which order to add certain spatial merge candidates to the list.

In general, video encoder 20 and video decoder 30 may be configured to derive a motion vector histogram from neighboring pixels or blocks. As discussed above, FIG. 16 shows an example of 4×4 neighboring blocks (a-k) to be used for a motion vector histogram of the 16×16 current block 450. The highlighted blocks (a, e, f, j, and k) are the locations of spatial merge candidates in HEVC.

In some examples, video encoder 20 and video decoder 30 derive the motion vector histogram from the motion vector distribution of neighboring blocks with a certain size. FIG. 16 shows what neighboring blocks (a-k) will be used to construct the MV histogram. The unit size of neighboring blocks can be a specific size, e.g., 4×4 or some predefined minimum size for motion compensation. If the blocks do not have associated motion information (e.g., intra-predicted blocks), they are ignored or may be filled with the motion information from other neighboring blocks. For example, if neighboring block h is an intra-predicted block, video encoder 20 and video decoder 30 may simply not use that neighboring block. In other examples, if neighboring block h is an intra-predicted block, video encoder 20 and video decoder 30 may use motion information from a block to the left of neighboring block h.

As shown in an example in FIG. 16, to construct a MV histogram of 16×16 current block, video encoder 20 and video decoder 30 may examine 11 neighboring blocks (from block a to block k) with the size of 4×4. Note that the neighboring blocks could be predefined as in FIG. 16 (including the top row/left column), or dependent on the size and/or the shape of the current block.

In another example, the histogram may be constructed with a certain weight proportional to the size of neighboring blocks. For example, the number of pixels (or unit blocks, i.e. 4×4 block) belonging to neighboring blocks can be used as weights for the histogram. That is, motion vectors from bigger blocks (specifically, blocks containing more pixels) have higher weights proportional to the number of pixels within those blocks. In another example, the weight for the histogram can be determined by the combination of above-mentioned two factors: the number of pixels (or unit blocks) within neighboring blocks and the number of pixels (or unit block) adjacent to the current block.

Note that both video encoder 20 and video decoder 30 should follow an identical rule to construct the histogram to avoid a mismatch. Given an identical histogram both in video encoder 20 and video decoder 30, all the following adaptive schemes for the merge candidates will lead to an equivalent merge list.

After determining the motion vector histogram, video encoder 20 and video decoder 30 may then use the histogram to determine an order of spatial merge candidates in the motion vector candidate list. In some examples, the constructed histogram can be used to determine an order of a given (fixed) $N_f$ spatial merge candidates, where $N_f$ is the number of fixed spatial candidates. As one example, the fixed $N_f$ spatial candidates may be neighboring blocks a, e, f, j, and k, as is used in HEVC. However, any subset of a total number of candidates may be used. For example, with reference to FIG. 16, any fixed subset of neighboring blocks a-k may be used as spatial merge candidates.

Depending on the frequency of each motion vector of the available neighboring blocks, the most frequent motion vector from the histogram is inserted first into the merge list and the least frequent motion vector from the histogram is the last one among the spatial merge candidates to be inserted to the list. For example, FIG. 16 illustrates 5 spatial merge candidates (a, e, f, j, k) used in HEVC. Instead of following a fixed order of those candidates (the order of j-e-f-k-a in HEVC), both video encoder 20 and video decoder 30 may be configured adaptively determine the order from the MV histogram. In another example, instead of checking each neighboring block (e.g., 4×4 spatial merge candidates), the re-ordering of spatial merging candidates is based on the size of prediction block (e.g., PU in HEVC), that contains the block used to derive the spatial merging candidates.

Figure 17:
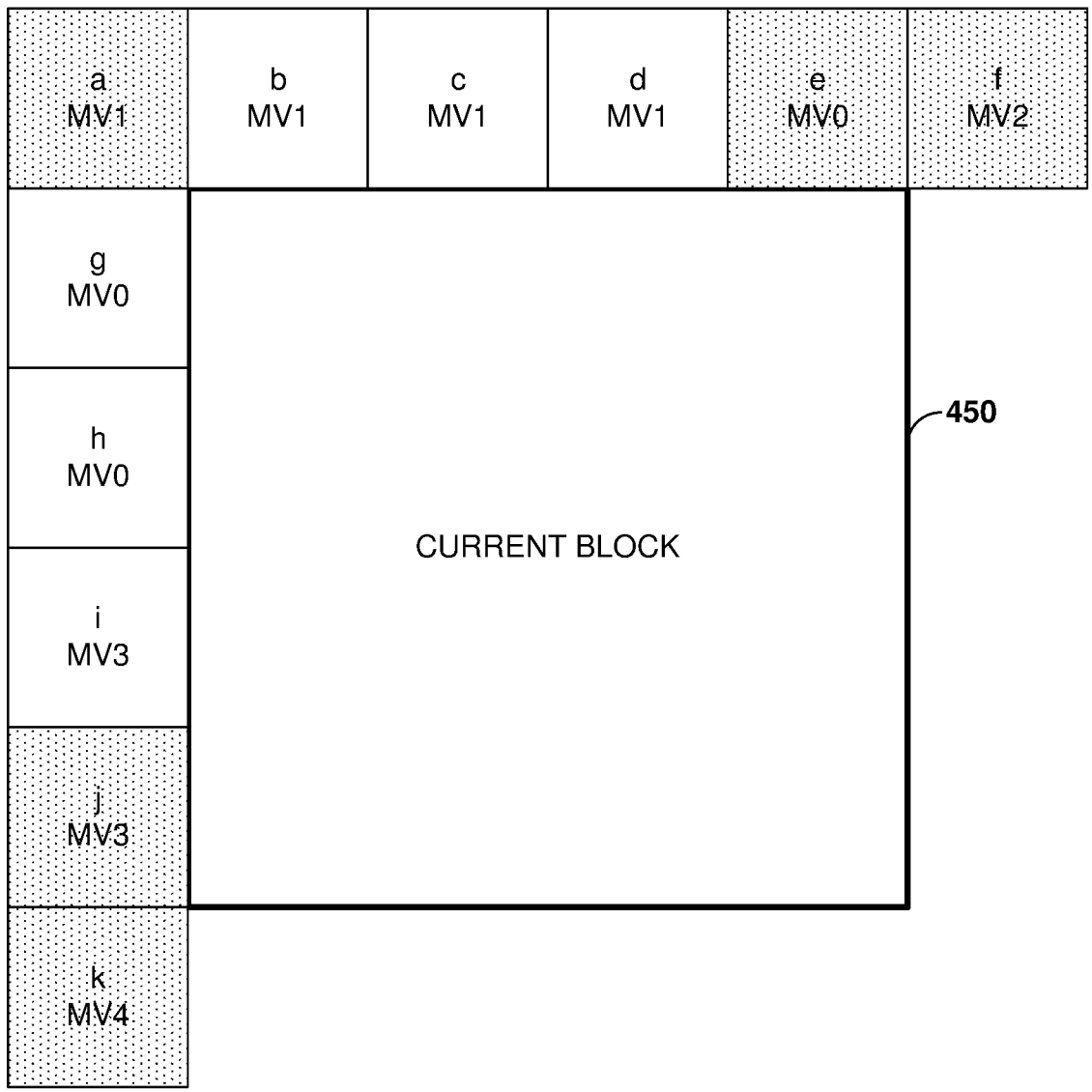
FIG. 17 is a conceptual diagram showing another example of a PU and neighboring blocks.

Consider the example of FIG. 17. As shown in FIG. 17, three neighboring blocks (e, g, and h) have motion vector 0 (MV0), four different neighboring blocks (a, b, c, and d) have motion vector 1 (MV1), one neighboring block (f) has motion vector 2 (MV2), two different neighboring blocks (i and j) have motion vector 3 (MV3), and one neighboring block (k) has motion vector 4 (MV4). Accordingly, video encoder 20 and video decoder 30 would be configured to order the motion vector candidate list, using fixed candidates a, e, f, j, and k, as follows: MV1—candidate a (index 0), MV0—candidate e (index 0), MV3 candidate j (index 0), MV2 candidate f (index 0), MV4—candidate k (index 0). The example of FIG. 17 assumes that all neighboring blocks have the same weight. In some examples, if two or more of the fixed candidates have the same associated motion vector that has the same number of occurrences in the histogram (e.g., MV2 and MV4 in FIG. 17), a predetermined order may be used for those checking candidates. In the example of FIG. 17, candidate f is placed in the list before candidate k. However, any predetermined order could be used.

In another example of the disclosure, after determining the motion vector histogram, video encoder 20 and video decoder 30 may then use the histogram to determine which of the neighboring blocks to use as spatial merge candidates in the motion vector candidate list, regardless of order. That is, rather than used a fixed $N_f$ number of spatial merging candidates, video encoder 20 and video decoder 30 may determine which of all possible neighboring blocks to use as spatial merge candidates in the list. In this example, with reference to FIG. 16, all neighboring blocks a-k may be considered for inclusion as spatial merge candidates in the motion vector candidate list.

Video encoder 20 and video decoder 30 may use the motion vector histogram to determine which neighboring blocks, among the total number of available neighboring blocks, will make up the predetermined number ($N_h$) of candidates in the motion vector candidate list. Instead of changing only the order of a given list of candidates, as described above, both locations (e.g., which actual neighboring blocks) and the order of the determined spatial merge candidates can be adaptively derived from neighboring motion vector distribution in the determined histogram. For example, if $N_h=2$, the two most frequent motion vectors from the neighboring blocks are placed in the order of the frequency at the merge list. If more than one neighboring block is associated with the most frequent motion vector in the histogram, video encoder 20 and video decoder 30 may use predetermined rules to determine which of the neighboring blocks to place in the candidate list. However, note that no matter what rule is used, neighboring blocks that are associated with a motion vector that appears most frequently in the histogram will be added to the motion vector candidate list. In accordance with this example, referring to FIG. 17, a neighboring block associated with MV0 and a neighboring block associated with MV1 would be added to the motion vector candidate list.

In some examples, video encoder 20 and video decoder 30 may be configured to use both of the above techniques for merge list construction using the determined histogram. That is, video encoder 20 and video decoder 30 may both order a fixed set of candidates using the histogram, as well as adding a number of non-fixed candidates ($N_h$) based on the histogram. As mentioned above, the locations of $N_f$ spatial merge candidates are fixed throughout all the blocks, e.g., blocks a, e, f, j, and k in FIG. 16. In addition, the $N_h$, most frequently appearing motion information from the neighboring blocks are added as spatial merge candidates to the list, then the order of ($N_f+N_h$) candidates is determined based on the frequency of occurrence of the associated motion vectors in the determined histograms.

In another example, the locations of $N_f$ spatial merge candidates are fixed throughout all the blocks, e.g. block a, e, f, j, and k in FIG. 16, and video encoder 20 and video decoder 30 determines the order of the fixed candidates using the determined histogram. In addition, the $N_h$ most frequently appearing motion information from the neighboring blocks are added to the list, but the additional $N_h$ candidates are inserted to a certain predetermined position (e.g., before or after the motion vector from block e in FIG. 16).

In another example, this disclosure describes an adaptive ordering of sub-PU merge candidates, e.g. ATMVP and ATMVP_EXT candidates described above. In one example of the JEM2.0 software, ATMVP and ATMVP_EXT are always placed between candidate k and candidate a (e.g., as shown in FIG. 16). Instead of placing ATMVP/ATMVP_EXT at a fixed location in the merge list, video encoder 20 and video decoder 30 may be configured to adaptively place ATMVP/ATMVP_EXT candidates depending on the conditions that relate to other available merge candidates, ATMVP/ATMVP_EXT, or combinations of them.

In some examples, a motion vector difference (MVD) between two spatial merge candidates can be exploited to determine the locations of ATMVP/ATMVP_EXT candidates. Video encoder 20 and video decoder 30 may be configured to calculate the MVD as a function of motion vectors. In one example, the sum of absolute difference between two MVs: $MVD=abs(MV_x[1]-MV_x[0])+abs(MV_y[1]-MV_y[0])$. In another example, the function is defined as $MVD=(MV_x[1]-MV_x[0])*(MV_x[1]-MV_x[0])+(MV_y[1]-MV_y[0])*(MV_y[1]-MV_y[0])$. Note that the function for calculating MVD may be different based on the motion vector precision, such as integer, half, one quarter, one eighth, or one sixteenth pixel precision.

For example, unlike the latest JEM software that always places ATMVP/ATMVP_EXT between candidate k and a in FIG. 16, video encoder 20 and video decoder 30 may be configured to locate ATMVP/ATMVP_EXT candidates before candidate k, depending on the MVD between candidate j and candidate k ($MVD_{jk}$). If $MVD_{jk}$ is less than a threshold, TH1, or larger than another threshold, TH2, i.e. $MVD_{jk}<TH1$ or $MVD_{jk}>TH2$, ATMVP/ATMVP_EXT is located before the candidate k. For example, an adaptive threshold can be used by computing TH1 by taking the minimum MVD among all or (some) spatially neighboring motion vectors and TH2 by taking the maximum MVD, where the computation excludes identical MV pairs and the pair of (MVj and MVk). Since both video encoder 20 and video decoder 30 have access identical neighboring motion vectors, the computation will lead to the same TH1 and TH2. Alternatively, both TH1 and TH2 can be experimentally determined, e.g., TH1=2 and TH2=8 in one sixteenth pixel MV precision. Otherwise, candidate k resides before ATMVP/ATMVP_EXT in the list. Similarly, video encoder 20 and video decoder 30 may be configured to determine the order of ATMVP/ATMVP_EXT candidate and candidate f by examining the MVD between candidate e and candidate f ($MVD_{ef}$). If one or neither of the candidates used for MVD computation, candidate k or candidate a in above example, is not available in the merge list, the ATMVP/ATMVP_EXT candidate may be placed in the motion vector candidate list in the default order.

In another example, video encoder 20 and video decoder 30 may be configured to analyze the characteristics of the ATMVP/ATMVP_EXT candidate, e.g., the variance of sub-block MVs or spatial distribution of sub-block MVs, to determine where those candidates would be located in the motion vector candidate list. If the variance is within a range [$TH_1$, $TH_2$], higher priority, i.e. smaller index in the list, is assigned. The range [$TH_1$, $TH_2$] can be determined by the average variance of sub-block MVs of previously coded blocks that chose ATMVP or ATMVP_EXT as the best merge candidate: $TH_1=C_1*Var_1$ and $TH_2=C_2*Var_2$, where Var1 and Var2 are computed and stored from previously coded blocks. The coefficients $C_1$ and $C_2$ can be fixed as constants or depend on the size and/or the shape of the current block. The range may depend on the size and/or the shape of the current block. For bigger blocks, both $TH_1$ and $TH_2$ increase and the range becomes wider. The range may be dependent on the motion vector precision.

In another example, video encoder 20 and video decoder 30 may be configured to analyze the status of both spatial merge candidates and ATMVP/ATMVP_EXT candidates to determine the order among those candidates. For example, the average motion vector or the most frequent sub-block motion vector from ATMVP or ATMVP_EXT candidates are considered as a delegate MV for sub-blocks. The representative motion vectors can be used to compute an MVD against a spatial candidate, e.g. block fin FIG. 16. If the MVD is greater than $TH_1$ but smaller than $TH_2$, video encoder 20 and video decoder 30 may be configured to place the ATMVP/ATMVP_EXT candidate before the spatial candidate.

In HEVC, a combination motion vector (combi-mv) candidate is derived using two available bi-directional merge candidates, i.e., C1 and C2, that include two motion vector for both prediction directions: reference list L0 and reference list L1. Suppose that both C1 and C2 have bi-directional MVs: $MV_{L0C1}$ and $MV_{L1C1}$ for the candidate C1, and $MV_{L0C2}$ and $MV_{L1C2}$ for the candidate C2. Video encoder 20 and video decoder 30 may be configured to derive new combi-mv, (MV0, MV1) by taking a L0 MV from C1 and a L1 MV from C2: (MV0, MV1)=($MV_{L0C1}$, $MV_{L1C2}$). Similarly, video encoder 20 and video decoder 30 may be configured to derive another combi-mv by taking the remaining MVs: (MV0', MV1')=($MV_{L0C2}$, $MV_{L1C1}$).

In some examples, the maximum number of combi-mv candidates is fixed. In HEVC, at most 12 combi-mv candidates may be considered as merge candidates if the number of available merge candidates is less than the maximum number of merge candidates, e.g. 5 in HEVC, and more than one bi-directional merge candidates are available in the list. In an extension of HEVC, more merge candidates such as ATMVP and ATMVP_EXT candidates are added thus increasing the maximum number of combi-mv candidates from 12 to a certain large number, e.g. 30, is a possible extension.

In another example of the disclosure, video encoder 20 and video decoder 30 may be configured to consider more combi-mv if necessary (e.g., if the maximum number of merge candidates is not yet reached). For example, if the similarities between available merge candidates are higher than a certain threshold, combi-mv candidates will also be similar to the existing candidates thus the maximum number of combi-mv is restrained. The similarities can be measured by sum of absolute differences (SADs), SATD, average luminance or chrominance value, variance of the pixels, and/or MV trajectory.

If more combi-mv are considered, adaptive ordering may be considered to maximize the benefit from spare combi-mv candidates. Given an order of combi-mv candidates, the following techniques re-arrange the candidates with respect to a certain criteria. The candidates not falling into the criteria follows the default order.

In some examples, video encoder 20 and video decoder 30 may be configured to reorder the combi-mv candidates with respect to similarities between a derived combi-mv and the existing my from available candidate. Suppose that both C1 and C2 have bi-directional MVs, $MV_{C1}=(MV_{L0C1}, MV_{L1C1})$ and $MV_{C2}=(MV_{L0C2}, MV_{L1C2})$, and that two combi-mv can be derived as $MV_{combi-1}=(MV_{L0C1}, MV_{L1C2})$ and $M_{combi-2}=(MV_{L0C2}, MV_{L1C1})$. If $MV_{L0C1}$ and $MV_{L0C2}$ (and/or $MV_{L1C2}$ and $MV_{L1C1}$) refers to the same picture, MVD between $MV_{L0C1}$ and $MV_{L0C2}$ (and/or $MV_{L1C2}$ and $MV_{L1C1}$) is computed. Then, video encoder 20 and video decoder 30 may be configured to add the derived combi-mv to the motion vector candidate list after pruning if one of the following conditions is satisfied: (1) If MVD is between two thresholds, $TH_1$<MVD<$TH_2$, or (2) If $MV_{L0C1}$ and $MV_{L0C2}$ refers to different pictures. Otherwise, the combi-mv is left behind. In one example for one-sixteenth pixel motion vector precision, TH1=2 and TH2=8 when both the width and height of current block are smaller than 8. If the width and height of current block is larger than 8 and smaller than 32, TH1=8 and TH2=32. If the width and height are larger than 32, TH1=16 and TH2=64. Once all the combi-mv candidates satisfying those conditions are first added to the merge list, video encoder 20 and video decoder 30 may be configured to add the remaining combi-mv to the list after pruning. The thresholds, $TH_1$ and $TH_2$, can be adaptively chosen by the size or the shape of the current block, e.g. max(width, height).

In yet another example, video encoder 20 and video decoder 30 may be configured to sort the combi-mv candidates with respect to above-mentioned MVD. For simplicity, MVDs of combi-mv candidates whose $MV_{L0C1}$ and $MV_{L0C2}$ (or $MV_{L1C1}$ and $MV_{L1C2}$) refers to different pictures are set as 0. If combi-mv candidates have equal MVD values, they follow the default order. Once sorted, video encoder 20 and video decoder 30 may be configured to add the candidates to the motion vector candidate list after pruning.

In addition to POC-based pruning, as described above, video encoder 20 and video decoder 30 may be configured to further prune merge candidates using adaptive criteria to be determined by additional information other than the motion vector itself (e.g., the size and/or the shape of the current block, the type of target merge candidates, and/or the location of merge candidates if spatial).

In some examples, video encoder 20 and video decoder 30 may be configured to consider a pair of MVs with smaller MVD than an adaptive threshold as identical, and thus pruned to diversify the motion vector candidate list further. The threshold may be adaptively chosen by the size and/or the shape of the current block.

In some examples, a pruning method such as an MVD-based pruning with an adaptive threshold above can be applied to all the types of merge candidates: spatial, temporal, sub-block, or combi-mv candidates. In yet another example, for different types of candidates, different criteria can be considered. As an example of spatial candidates, the distance between the locations where those candidates are derived can be used as a metric to determine the adaptive threshold. For example, if two motion vectors are derived from adjacent blocks, e.g. block e and f in FIG. 16, the motion vectors are pruned by a smaller threshold than that of which motion vectors are derived from distant blocks, e.g., block f and k in FIG. 16.

In some examples, for a bi-directional merge candidate, the similarity of two uni-predicted blocks (one from L0 and another from L1 direction) could indicate how reliable the merge candidate would be. Based on this observation, video encoder 20 and video decoder 30 may be configured to use a measurement to differentiate the bi-directional merge candidates by using the similarity of two uni-predicted blocks and re-order the bi-directional merge candidates, accordingly. For example, video encoder 20 and video decoder 30 may be configured to use a sum of absolute differences (SADs), SSE, SATD, average luminance or chrominance value, variance of the pixels, and/or MV trajectory to determine the similarity. More complex metrics could provide higher accuracy to measure the prediction performance. The decision of the metric may depend on the requirements of the target application.

If SAD is used, for given two bi-directional merge candidates, C1 and C2, two SADs are computed between L0 and L1 directions for each bi-directional candidate: $SAD_{C1}$ and $SAD_{C2}$. Video encoder 20 and video decoder 30 may be configured to place the candidate with smaller final SAD, i.e. $SAD_{C1}$ or $SAD_{C2}$, ahead of the other in the merge list.

In some examples, all the proposed techniques described above can be combined to construct a motion vector candidate list. In yet another example, a certain set or subset of the proposed techniques can be incorporated.

Figure 18:
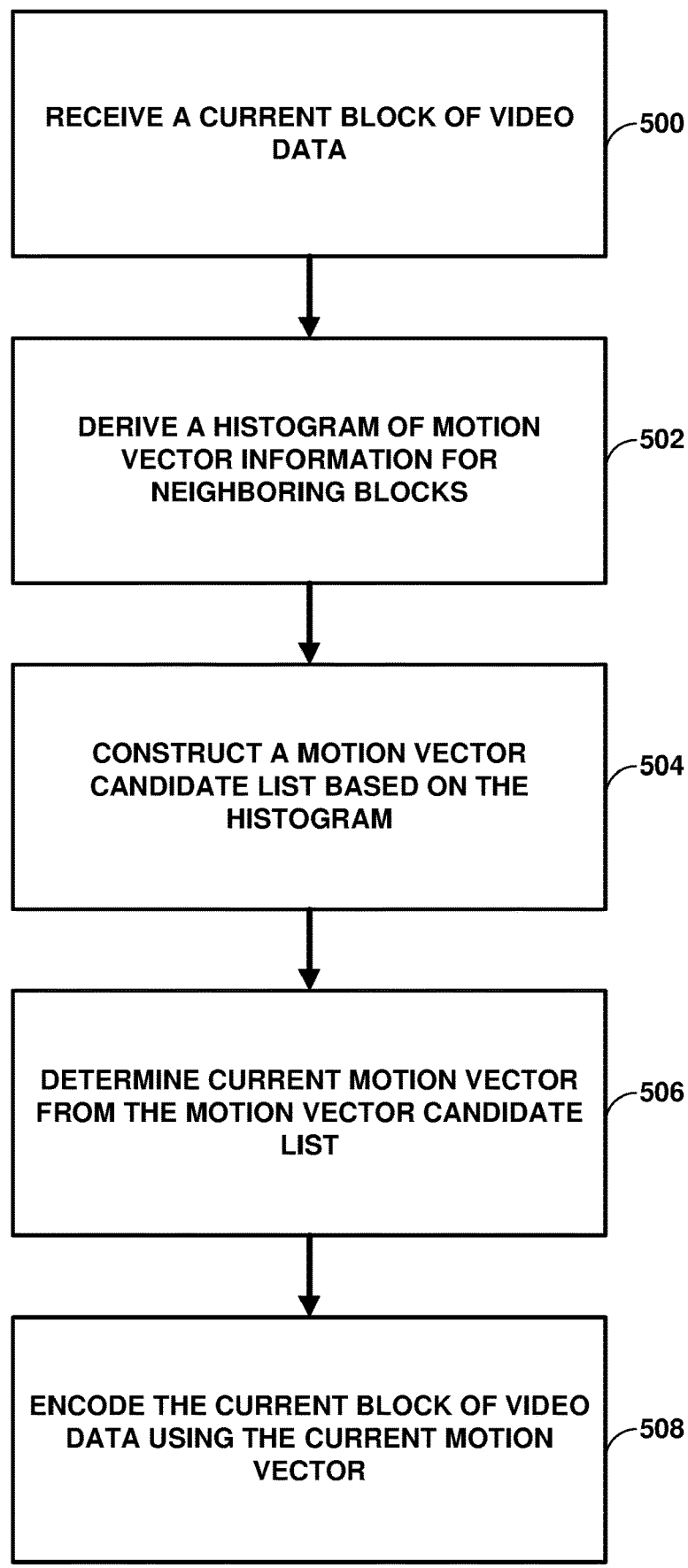
FIG. 18 is a flowchart showing an example encoding method of the disclosure.

FIG. 18 is a flowchart showing an example encoding method of the disclosure. The techniques of FIG. 18 may be performed by one or more hardware units of video encoder 20, including motion estimation unit 42 and motion compensation unit 44.

In one example of the disclosure, video encoder 20 may be configured to receive the current block of video data (500). Video encoder 20 may derive a histogram of motion vector information for neighboring blocks relative to the current blocks (502). In one example of the disclosure, the number of neighboring blocks considered for the motion vector candidate list is based on the size of the current block, and the number of neighboring blocks is greater than 5. In this context, the term "considered" may include video encoder 20 analyzing the neighboring block, determining if the neighboring block has associated motion information, and if the neighboring block has associated motion information, using the motion information to construct the motion vector candidate list. As was explained above, the motion information may be added to the motion vector candidate list directly, or may be used to construct a histogram that may be used to determine the order and/or locations of neighboring blocks to uses as spatial merge candidate in the motion vector candidate list. Video encoder 20 may be further configured to construct a motion vector candidate list of merge candidates for the current block of video data based on motion information from the number of neighboring blocks relative to the current block. In some examples, the motion information considered is the derived histogram (504). Video encoder 20 may then determine a current motion vector from the motion vector candidate list (506), and encode the current block of video data using the current motion vector (508).

In another example of the disclosure, video encoder 20 may be configured to order a predetermined fixed subset of spatial merge candidates in the motion vector candidate list based on the derived histogram.

In another example of the disclosure, video encoder 20 may be configured to determine a fixed number of spatial merge candidates from the total number of neighboring blocks to add to the motion vector candidate list based on the derived histogram.

In another example of the disclosure, video encoder 20 may be configured to determine a fixed number of spatial merge candidates from the total number of neighboring blocks to add to the motion vector candidate list based on the derived histogram, and order a predetermined fixed subset of spatial merge candidates and the determined fixed number of spatial merge candidates in the motion vector candidate list based on the derived histogram.

In another example of the disclosure, video encoder 20 may be configured to order a predetermined fixed subset of spatial merge candidates in the motion vector candidate list based on the derived histogram, determine a fixed number of spatial merge candidates from the total number of neighboring blocks to add to the motion vector candidate list based on the derived histogram, and insert the determined fixed number of spatial merge candidates at a predetermined location in the motion vector candidate list.

In another example of the disclosure, video encoder 20 may be configured to add an advanced temporal motion vector prediction (ATMVP) candidate to the motion vector candidate list based on a function of motion vectors for one or more ATMVP candidates. In another example of the disclosure, video encoder 20 may be configured to determine a location in the motion vector candidate list for adding the ATMVP candidate based on the function of motion vectors for one or more ATMVP candidates.

In another example of the disclosure, video encoder 20 may be configured to determine a combined motion vector candidate by combining motion vector information from two bi-directional motion vector candidates, and add the combined motion vector candidate to the motion vector candidate list.

In another example of the disclosure, video encoder 20 may be configured to determine a location in the motion vector candidate list for adding the combined motion vector candidate based on the function of motion vectors for one or more combined motion vector candidates.

In another example of the disclosure, video encoder 20 may be configured to prune the motion vector candidate list based on motion vector difference information of the motion vector candidates in the motion vector candidate list.

In another example of the disclosure, video encoder 20 may be configured to order bi-directional candidates in the motion vector candidate list based on motion vector difference information of the bi-directional candidates.

Figure 19:
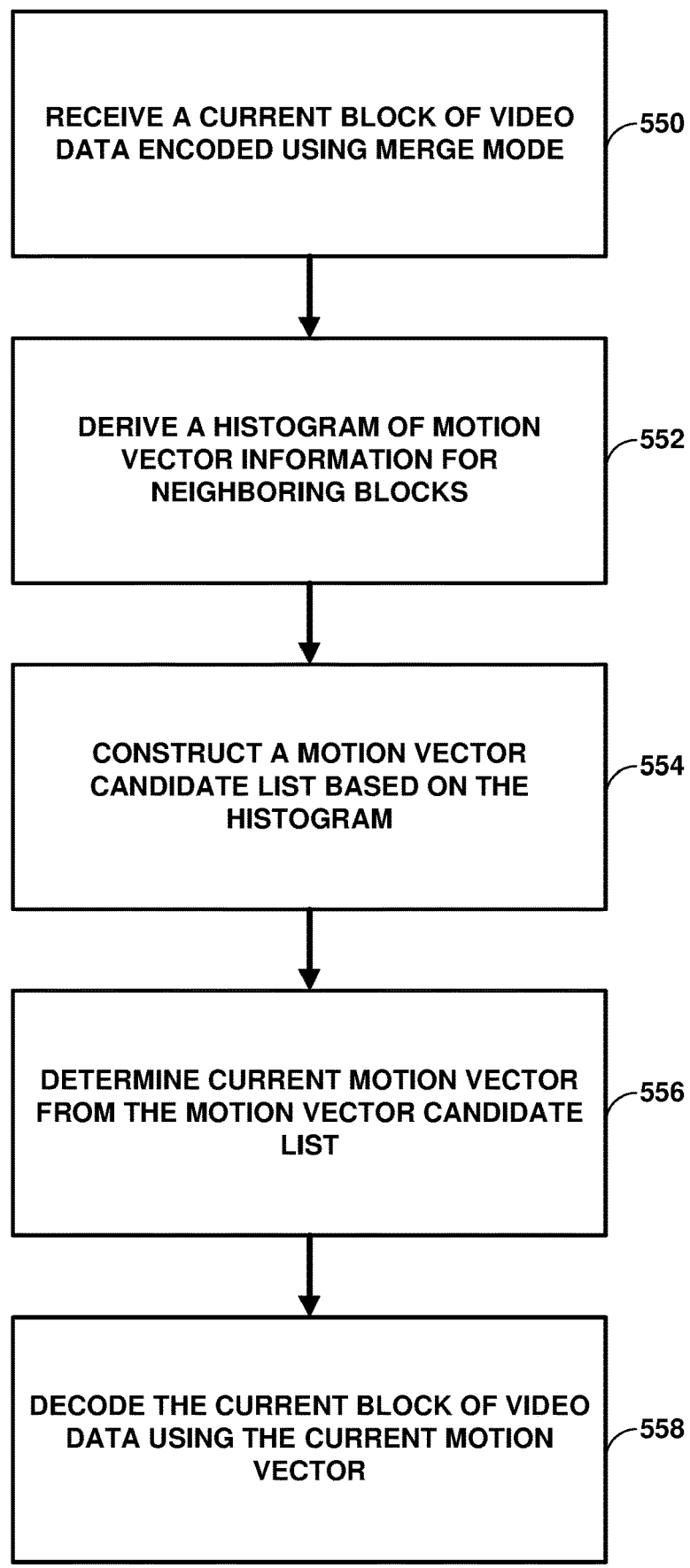
FIG. 19 is a flowchart showing an example decoding method of the disclosure.

FIG. 19 is a flowchart showing an example decoding method of the disclosure. The techniques of FIG. 19 may be performed by one or more hardware units of video decoder 30, including motion compensation unit 72.

In one example of the disclosure, video decoder 30 may be configured to receive the current block of video data encoded using merge mode (550). Video decoder 30 may derive a histogram of motion vector information for neighboring blocks relative to the current blocks (552). In one example of the disclosure, the number of neighboring blocks considered for the motion vector candidate list is based on the size of the current block, and the number of neighboring blocks is greater than 5. In this context, the term "considered" may include video decoder 30 analyzing the neighboring block, determining if the neighboring block has associated motion information, and if the neighboring block has associated motion information, using the motion information to construct the motion vector candidate list. As was explained above, the motion information may be added to the motion vector candidate list directly, or may be used to construct a histogram that may be used to determine the order and/or locations of neighboring blocks to uses as spatial merge candidate in the motion vector candidate list. Video decoder 30 may be further configured to construct a motion vector candidate list of merge candidates for the current block of video data based on motion information from the number of neighboring blocks relative to the current block. In some examples, the motion information considered is the derived histogram (554). Video decoder 30 may then determine a current motion vector from the motion vector candidate list (556), and decode the current block of video data using the current motion vector (558).

In another example of the disclosure, video decoder 30 may be configured to order a predetermined fixed subset of spatial merge candidates in the motion vector candidate list based on the derived histogram.

In another example of the disclosure, video decoder 30 may be configured to determine a fixed number of spatial merge candidates from the total number of neighboring blocks to add to the motion vector candidate list based on the derived histogram.

In another example of the disclosure, video decoder 30 may be configured to determine a fixed number of spatial merge candidates from the total number of neighboring blocks to add to the motion vector candidate list based on the derived histogram, and order a predetermined fixed subset of spatial merge candidates and the determined fixed number of spatial merge candidates in the motion vector candidate list based on the derived histogram.

In another example of the disclosure, video decoder 30 may be configured to order a predetermined fixed subset of spatial merge candidates in the motion vector candidate list based on the derived histogram, determine a fixed number of spatial merge candidates from the total number of neighboring blocks to add to the motion vector candidate list based on the derived histogram, and insert the determined fixed number of spatial merge candidates at a predetermined location in the motion vector candidate list.

In another example of the disclosure, video decoder 30 may be configured to add an advanced temporal motion vector prediction (ATMVP) candidate to the motion vector candidate list based on a function of motion vectors for one or more ATMVP candidates. In another example of the disclosure, video encoder 20 may be configured to determine a location in the motion vector candidate list for adding the ATMVP candidate based on the function of motion vectors for one or more ATMVP candidates.

In another example of the disclosure, video decoder 30 may be configured to determine a combined motion vector candidate by combining motion vector information from two bi-directional motion vector candidates, and add the combined motion vector candidate to the motion vector candidate list.

In another example of the disclosure, video decoder 30 may be configured to determine a location in the motion vector candidate list for adding the combined motion vector candidate based on the function of motion vectors for one or more combined motion vector candidates.

In another example of the disclosure, video decoder 30 may be configured to prune the motion vector candidate list based on motion vector difference information of the motion vector candidates in the motion vector candidate list.

In another example of the disclosure, video decoder 30 may be configured to order bi-directional candidates in the motion vector candidate list based on motion vector difference information of the bi-directional candidates.

As an example, a combination of proposed techniques show 0.4% BD-rate improvement in Random Access configuration on JEM2.0 software as in the following table. The gain in the example below comes from the combinations of tools: (1) histogram-based spatial merge candidate ordering (2) MVD-based combined merge candidate ordering and pruning (3) pruning on ATMVP, combined, zero-mv candidates (4) and an increased number of merge candidates and combi-merge candidates.

|  | randomaccess_jvet10 | | | | |
| --- | --- | --- | --- | --- | --- |
|  | Y | U | V | EncTime | DecTime |
| ClassA1 | −0.02% | 0.34% | −0.67% | 112% | 104% |
| ClassA2 | −0.81% | −0.70% | −0.56% | 119% | 103% |
| ClassB | −0.46% | −0.14% | −0.36% | 122% | 107% |
| ClassC | −0.27% | −0.32% | −0.33% | 119% | 106% |
| ClassD | −0.38% | −0.15% | −0.31% | 123% | 106% |
| Overall | −0.39% | −0.19% | −0.44% | 119% | 105% |

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving a current block of video data encoded with an inter prediction mode;
   analyzing a plurality of neighboring blocks relative to the current block to determine whether any neighboring blocks among the plurality of neighboring blocks include motion information, wherein a number of the neighboring blocks analyzed among the plurality of neighboring blocks is greater than 5;
   determining a plurality of weights, wherein each weight among the plurality of weights respectively corresponds to motion information included within a set of neighboring blocks, among the plurality of neighboring blocks, that include motion information;
   constructing a motion vector candidate list for the current block of video data based on the motion information from the set of neighboring blocks relative to the current block;
   adaptively ordering motion vector candidates within the constructed motion vector candidate list for the current block of video data based on the plurality of weights;
   determining a current motion vector from the motion vector candidates within the motion vector candidate list; and
   decoding the current block of video data using the current motion vector.

2. The method of claim 1, wherein determining the plurality of weights comprises determining at least one weight of the plurality of weights based on a number pixels belonging to the neighboring block that includes the corresponding motion information.

3. The method of claim 1, wherein at least one weight of the plurality of weights is proportional to a size the neighboring block that includes the corresponding motion information.

4. The method of claim 1, wherein adaptively ordering the motion vector candidates within the constructed motion vector candidate list comprises:
   updating at least one weight of the plurality of weights; and
   sorting an order of the motion vector candidates within the constructed motion vector candidate list based on the updated at least one weight of the plurality of weights.

5. The method of claim 4, wherein sorting the order of the motion vector candidates within the constructed motion vector candidate list comprises placing a first motion information corresponding to a higher value of weight before a second motion information corresponding to a lower value of weight in the constructed motion vector candidate list.

6. The method of claim 1, wherein determining the plurality of weights comprises determining each of the plurality of weights based on a number of pixels adjacent to the current block.

7. The method of claim 1, wherein the inter prediction mode corresponds to a merge mode.

8. An apparatus configured to decode video data, the apparatus comprising:
   a memory configured to store a current block of video data; and
   one or more processors configured to:
      receive a current block of video data encoded with an inter prediction mode;
      analyze a plurality of neighboring blocks relative to the current block to determine whether any neighboring blocks among the plurality of neighboring blocks include motion information, wherein a number of the neighboring blocks analyzed among the plurality of neighboring blocks is greater than 5;
      determine a plurality of weights, wherein each weight among the plurality of weights respectively corresponds to motion information included within a set of neighboring blocks, among the plurality of neighboring blocks, that include motion information;
      construct a motion vector candidate list for the current block of video data based on the motion information from the set of neighboring blocks relative to the current block;

adaptively order motion vector candidates within the constructed motion vector candidate list for the current block of video data based on the plurality of weights;
determine a current motion vector from the motion vector candidates within the motion vector candidate list; and
decode the current block of video data using the current motion vector.

9. The apparatus of claim 8, wherein the one or more processors are further configured to determine at least one weight of the plurality of weights based on a number pixels belonging to the neighboring block that includes the corresponding motion information.

10. The apparatus of claim 8, wherein at least one weight of the plurality of weights is proportional to a size the neighboring block that includes the corresponding motion information.

11. The apparatus of claim 8, wherein, to adaptively order the motion vector candidates within the constructed motion vector candidate list, the one or more processors are further configured to:
update at least one weight of the plurality of weights; and
sort an order of the motion vector candidates within the constructed motion vector candidate list based on the updated at least one weight of the plurality of weights.

12. The apparatus of claim 11, wherein, to sort the order of the motion vector candidates within the constructed motion vector candidate list, the one or more processors are further configured to place a first motion information corresponding to a higher value of weight before a second motion information corresponding to a lower value of weight in the constructed motion vector candidate list.

13. The apparatus of claim 8, wherein the one or more processors are further configured to determine each of the plurality of weights based on a number of pixels adjacent to the current block.

14. The apparatus of claim 8, wherein the inter prediction mode corresponds to a merge mode.

15. An apparatus configured to encode video data, the apparatus comprising:
a memory configured to store a current block of video data; and
one or more processors configured to:
receive a current block of video data encoded with an inter prediction mode;
analyze a plurality of neighboring blocks relative to the current block to determine whether any neighboring blocks among the plurality of neighboring blocks include motion information, wherein a number of the neighboring blocks analyzed among the plurality of neighboring blocks is greater than 5;
determine a plurality of weights, wherein each weight among the plurality of weights respectively corresponds to motion information included within a set of neighboring blocks, among the plurality of neighboring blocks, that include motion information;
construct a motion vector candidate list for the current block of video data based on the motion information from the set of neighboring blocks relative to the current block;
adaptively order motion vector candidates within the constructed motion vector candidate list for the current block of video data based on the plurality of weights;
determine a current motion vector from the motion vector candidates within the motion vector candidate list; and
encode the current block of video data using the current motion vector.

16. The apparatus of claim 15, wherein the one or more processors are further configured to determine at least one weight of the plurality of weights based on a number pixels belonging to the neighboring block that includes the corresponding motion information.

17. The apparatus of claim 15, wherein at least one weight of the plurality of weights is proportional to a size the neighboring block that includes the corresponding motion information.

18. The apparatus of claim 15, wherein, to adaptively order the motion vector candidates within the constructed motion vector candidate list, the one or more processors are further configured to:
update at least one weight of the plurality of weights; and
sort an order of the motion vector candidates within the constructed motion vector candidate list based on the updated at least one weight of the plurality of weights.

19. The apparatus of claim 18, wherein, to sort the order of the motion vector candidates within the constructed motion vector candidate list, the one or more processors are further configured to place a first motion information corresponding to a higher value of weight before a second motion information corresponding to a lower value of weight in the constructed motion vector candidate list.

20. The apparatus of claim 15, wherein the one or more processors are further configured to determine each of the plurality of weights based on a number of pixels adjacent to the current block.

21. The apparatus of claim 15, wherein the inter prediction mode corresponds to a merge mode.

22. A non-transitory computer-readable storage medium storing instructions that, when executed, causes one or more processors configured to decode video data to:
receive a current block of video data encoded with an inter prediction mode;
analyze a plurality of neighboring blocks relative to the current block to determine whether any neighboring blocks among the plurality of neighboring blocks include motion information, wherein a number of the neighboring blocks analyzed among the plurality of neighboring blocks is greater than 5;
determine a plurality of weights, wherein each weight among the plurality of weights respectively corresponds to motion information included within a set of neighboring blocks, among the plurality of neighboring blocks, that include motion information;
construct a motion vector candidate list for the current block of video data based on the motion information from the set of neighboring blocks relative to the current block;
adaptively order motion vector candidates within the constructed motion vector candidate list for the current block of video data based on the plurality of weights;
determine a current motion vector from the motion vector candidates within the motion vector candidate list; and
decode the current block of video data using the current motion vector.

* * * * *